US012701001B2

(12) United States Patent
Comi et al.

(10) Patent No.: US 12,701,001 B2
(45) Date of Patent: Aug. 4, 2026

(54) TRANSFORMER-BASED AI-MODULE WITH AN ACTIVATION FUNCTION

(71) Applicant: INTERNATIONAL BUSINESS MACHINES CORPORATION, Armonk, NY (US)

(72) Inventors: Daniele Comi, Bernareggio (IT); Stefano Braghin, Dublin (IE); Martina Verrelli, Rome (IT); Cristina Bonanni, Rome (IT)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 19/055,180

(22) Filed: Feb. 17, 2025

(65) Prior Publication Data

US 2026/0205288 A1      Jul. 16, 2026

(51) Int. Cl.
| | |
|---|---|
| H04L 29/06 | (2006.01) |
| H04L 9/00 | (2022.01) |
| H04L 9/08 | (2006.01) |

(52) U.S. Cl.
CPC ............ H04L 9/0894 (2013.01); H04L 9/008 (2013.01)

(58) Field of Classification Search
None
See application file for complete search history.

(56) References Cited

U.S. PATENT DOCUMENTS

| | | | |
|---|---|---|---|
| 12,463,792 B2 * | 11/2025 | Blatt ....................... | G06F 17/17 |
| 2024/0119289 A1 * | 4/2024 | Gonzalez Sanchez ...................... | |
| | | | G06N 3/082 |
| 2024/0259180 A1 * | 8/2024 | Joye ........................ | H04L 9/008 |
| 2024/0297777 A1 | 9/2024 | Shaul et al. | |
| 2025/0037008 A1 * | 1/2025 | Mara ....................... | G06F 16/20 |

OTHER PUBLICATIONS

"AI Act", https://digital-strategy.ec.europa.eu/en/policies/regulatory-framework-ai, Feb. 18, 2025, 9 pages.
Aharoni et al., "HeLayers: a Tile Tensors Framework for Large Neural Networks on Encrypted Data", arXiv:2011.01805v3 [cs. CR], Jan. 1, 2023, 18 pages.

(Continued)

*Primary Examiner* — Andrew J Steinle
(74) *Attorney, Agent, or Firm* — Stosch Sabo

(57) ABSTRACT

Described are techniques for a method for calculating a fully homomorphically encrypted output value of a function of a transformer-based AI-module, dependent on a fully homomorphically encrypted input value of the function, the function representing a non-linear function to be approximated by the function. The method comprises providing fully homomorphically encrypted precomputed terms which are independent from the input value. The method further comprises calculating the output value of the function, using the transformer-based AI-Module, dependent on the precomputed terms and on polynomials. A respective polynomial depends on a difference between the input value and a center value associated to the respective polynomial. The associated center value indicates a center point at which the respective polynomial is centered and the associated center value differs from polynomial to polynomial.

20 Claims, 8 Drawing Sheets

(56)          References Cited

OTHER PUBLICATIONS

Baruch et al., "A Methodology for Training Homomorphic Encryption Friendly Neural Networks", arXiv:2111.03362v3 [cs.CR], Jul. 7, 2022, 19 pages.

Chen et al., "THE-X: Privacy-Preserving Transformer Inference with Homomorphic Encryption", arXiv:2206.00216v2 [cs.CR], Jun. 2, 2022, 11 pages.

Garimella et al., "Sisyphus: a Cautionary Tale of Using Low-Degree Polynomial Activations in Privacy-Preserving Deep Learning", arXiv:2107.12342v2 [cs.LG], Nov. 2, 2021, 6 pages.

Hesamifard et al., "CryptoDL: Deep Neural Networks over Encrypted Data", arXiv:1711.05189v1 [cs.CR], Nov. 14, 2017, 21 pages.

Hesamifard et al., "Privacy-preserving Machine Learning as a Service", Proceedings on Privacy Enhancing Technologies, 2018, pp. 123-142.

Kwon et al., "Efficient memory management for large language model serving with pagedattention", arXiv:2309.06180v1 [cs.LG], Sep. 12, 2023, 16 pages.

Panzade et al., "I can't see it but I can Fine-tune it: on Encrypted Fine-tuning of Transformers using Fully Homomorphic Encryption", arXiv:2402.09059v1 [cs.LG], Feb. 14, 2024, 8 pages.

Pope et al., "Efficiently Scaling Transformer Inference", arXiv:2211.05102v1 [cs.LG], Nov. 9, 2022, 18 pages.

Shabnam Khanna, "Approximating homomorphic evaluation: an analysis of approximation and optimisation techniques for accelerating homomorphic encryption", Student thesis: Doctoral Thesis, Queens University, Jul. 2024, 212 pages.

Wang et al., "CipherFormer: Efficient Transformer Private Inference with Low Round Complexity", arXiv:2403.16860v1 [cs.CR], Mar. 25, 2024, 6 pages.

Ye et al., "ChunkAttention: Efficient Attention on KV Cache with Chunking Sharing and Batching", ICLR, 2024, 15 pages.

Zhang et al., "Enhancing Privacy in Large Language Model with Homomorphic Encryption and Sparse Attention", Applied Sci., 2023, 19 pages.

Intellectual Property Office, Patents Act 1977: Search Report under Section 17(5), Jun. 30, 2025, 3 Pages, GB Application No. 2500575.2.

* cited by examiner

TRANSFORMER-BASED AI-MODULE WITH AN ACTIVATION FUNCTION

BACKGROUND

The present disclosure relates to the field of digital computer systems, and more specifically, to fully homomorphic encryption (FHE).

Fully homomorphic encryption (FHE) is a powerful cryptographic technique that enables computation on encrypted data without needing to decrypt it. This feature is particularly relevant to artificial intelligence (AI) models, as it provides a framework for ensuring data privacy and security while enabling effective computation. FHE helps organizations comply with strict data privacy regulations. However, FHE-type mathematical operations are computationally expensive compared to processing plaintext data. This may slow down AI model training and inference. The required computational resources for performing FHE-type mathematical operations for training an AI model may be that high that some applications may not be feasible.

SUMMARY

In some aspects, the techniques described herein relate to a method for calculating a fully homomorphically encrypted output value of a function of a transformer-based AI-module, dependent on a fully homomorphically encrypted input value of the function, the function representing a non-linear function to be approximated by the function. The method comprises providing fully homomorphically encrypted precomputed terms which are independent from the input value. The method further comprises calculating the output value of the function, using the transformer-based AI-Module, dependent on the precomputed terms and on polynomials. A respective polynomial depends on a difference between the input value and a center value associated to the respective polynomial. The associated center value indicates a center point at which the respective polynomial is centered and the associated center value differs from polynomial to polynomial.

In some aspects, the techniques described herein relate to a method for enhancing a transformer-based AI-module, the transformer-based AI-module comprising a non-linear function for calculating an output value of the non-linear function dependent on an input value. The method includes substituting the non-linear function with a function, the function depending on precomputed terms that are independent from the input value and on polynomials. A respective polynomial depends on a difference between the input value and a center value associated to the respective polynomial, where the associated center value indicates a center point at which the respective polynomial is centered and the associated center value differs from polynomial to polynomial. Further, the function is designed to prescribe an approximated output value of the non-linear function in response to presenting the input value as an argument of the non-linear function.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

In the following examples are explained in greater detail, by way of example only, making reference to the drawings in which.

DETAILED DESCRIPTION

Figure 1:
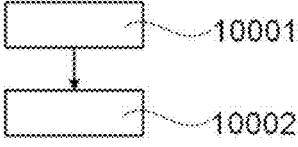
FIG. 1 is a flowchart of a method for for calculating a fully homomorphically encrypted output value of a function of an artificial intelligence module (AI-module) in accordance with an example of the present subject matter.

The present disclosure relates to the field of digital computer systems, and more specifically, to a method for calculating a homomorphically encrypted output value of a function of an artificial intelligence module (AI-module).

The descriptions of the various examples of the present disclosure will be presented for purposes of illustration but are not intended to be exhaustive or limited to the embodiments disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the embodiments disclosed herein.

The calculating of the encrypted output value of the function dependent on the polynomials may allow to compute the output value with a higher accuracy compared to determining the output value dependent on only one polynomial. The output value may approximate an output value of the non-linear function at the input value. The non-linear function may be a sigmoid or a Gaussian Error Linear Unit (GELU) function, in particular an activation function, of a neural network of the AI-module or an exponential function of a softmax function of the AI-module, in particular of an attention module of the AI-module.

In general, using the polynomials for approximating the non-linear function may allow to apply the approximated non-linear function on data which is fully homomorphically encrypted, such as the input value. By that, a mathematical operation associated to the non-linear function to be approximated may be performed in a ciphertext domain without the requirement for decrypting the encrypted input value. Homomorphic Encryption is a cryptographic technique that may allow computations to be performed directly on encrypted data, such as the encrypted input value, without needing to decrypt it first. Results of these computations remain encrypted, in particular homomorphically encrypted. The results may only be decrypted using a decryption key.

Homomorphic encryption (HE) may allow specific types of operation on encrypted data, such as addition or multiplication.

On the contrary, fully homomorphic encryption (FHE) may support any arbitrary computation on encrypted data. FHE may also support unlimited additions and multiplications on encrypted data in one example. This may be achieved using techniques such as bootstrapping to control noise in the encrypted data for example. Thus, by having the precomputed terms and the input value fully homomorphically encrypted it may be possible to perform unlimited additions and multiplications on intermediate data resulting from mathematical operations based on the precomputed terms and/or the input value in the ciphertext domain. In one example, the output value may be computed dependent on the intermediate data.

The phrase "encrypted" as used herein may be used as an abbreviation for "fully homomorphically encrypted". Exemplary terms being determined as a result of computations based on the encrypted input value and/or the precomputed terms may be fully homomorphically encrypted as well as this is the basic principle of FHE. For example, the calculated output value may be fully homomorphically encrypted as it depends on the input value and the precomputed terms which are fully homomorphically encrypted.

Calculating the output value dependent on the polynomials for approximating the non-linear function of the AI-module, in particular of the transformer-based AI-module, may allow to provide the AI-module in the form of a FHE AI-module, in particular to provide the transformer-based AI-module in form of a FHE transformer-based AI-module. This may allow to perform a training of the AI-module, in particular of the transformer-based AI-module, without decrypting confidential training data for the training. Thus, in one example, the AI-module is a FHE AI-module. In particular, the transformer-based AI-module may be a FHE transformer-based AI-module.

In one example, the input value may be encrypted fully homomorphically by encoding the input value to an input polynomial and fully homomorphically encrypting coefficients of the input polynomial using an exemplary fully homomorphic encryption scheme. The encrypted coefficients of the input polynomial may represent the input value in the ciphertext domain. The encryption scheme may be the BGV (Brakerski-Gentry-Vaikuntanathan), the BFV (Brakerski-Fan-Vercauteren), or CKKS (Cheon-Kim-Kim-Song) encryption scheme, for example. The encryption scheme may be based on lattice cryptography.

Similarly, the polynomials of the function may be provided in the ciphertext domain for computing the encrypted output value of the function dependent on the encrypted input value. In one example, coefficients of the polynomials may be encoded each into a respective cipher polynomial. The term "cipher polynomial" is used herein to distinguish the polynomials from those polynomials representing the coefficients of the polynomials in the ciphertext domain, i.e. the cipher polynomials. The cipher polynomials may comprise coefficients as well. The coefficients of the cipher polynomials may be encrypted fully homomorphically applying the exemplary fully homomorphic encryption scheme on the coefficients of the cipher polynomials resulting in encrypted coefficients of the cipher polynomials.

Similarly, the providing of the homomorphically encrypted precomputed terms may involve providing homomorphically encrypted coefficients of further polynomials, which may represent the precomputed terms in the ciphertext domain.

In one example, the calculating of the output value may comprise performing mathematical operations, for example performing summations and/or convolutions, with the encrypted coefficients of the input polynomial, the encrypted coefficients of the cipher polynomials and/or the encrypted coefficients of the further polynomials. The proposed method may be applicable independent from the FHE scheme used for encrypting the input value. The AI-module may be configured to apply homomorphic operations, for example performing summations or convolutions, on the encrypted coefficients of the input polynomial, the encrypted coefficients of the further polynomials and/or the encrypted coefficients of the cipher polynomials. For example, the AI-module may be designed to add the encrypted coefficients of the input polynomial with the encrypted coefficients of the cipher polynomials and/or with the encrypted coefficients of the further polynomials. In another example, the AI-module may be designed to perform a convolution of the encrypted coefficients of the input polynomial with the encrypted coefficients of the cipher polynomials and/or with the encrypted coefficients of the further polynomials. In addition, the AI-module may be configured to perform a modular reduction to keep a degree of intermediated polynomials resulting from homomorphic operations between the encrypted coefficients of the input polynomial, the encrypted coefficients of the cipher polynomials and/or the encrypted coefficients of the further polynomials within a prescribed bound.

In one example, the output value of the function may be represented in the form of an output polynomial. Coefficients of the output polynomial may result from applying the homomorphic operations on the encrypted coefficients of the input polynomial, the encrypted coefficients of the further polynomials and/or the encrypted coefficients of the cipher polynomials. The coefficients of the output polynomial may be obtained in an encrypted form automatically when applying the homomorphic operations.

Generally, the higher the degree of a polynomial being used for an approximation of a non-linear function, the more accurate the approximation may be. However, this may involve a higher computational cost when evaluating the polynomial. The higher computational cost may pose difficulties to implement FHE transformer-based AI-modules as the number of homomorphic operations may increase exponentially with the degree of the polynomials, in particular with respect to the convolution of the coefficients of the cipher polynomials. On the other hand, in the context of FHE, the more accurate the approximation of the non-linear function is, the less noise per computation may be produced. If the noise reaches a certain level, results of the homomorphic mathematical operations performed in the encrypted domain may not be decipherable precisely anymore. Hence, an accuracy of the approximation of the non-linear function may be prescribed in order to ensure that results of calculations of the FHE AI-module may be decipherable.

However, as the calculation of the output value of the function is performed dependent on the polynomials and the polynomials are centered around the different center points, the prescribed accuracy of the approximation of the non-linear function may be reached using a lower degree of the polynomials compared to calculating the output value dependent on only one polynomial which is centered at a single center point.

In other words, by calculating the output value dependent on the polynomials with the different center value for each polynomial may allow to reduce the degree of the polynomials while maintaining the same or a similar accuracy of the approximation of the non-linear function. This may reduce the computational cost for training and for inference of the FHE AI-module and in particular of the FHE transformer-based AI-module. By having the different center values which may each represent a different center point at which the respective polynomial is centered and by determining the encrypted output value of the function dependent on the polynomials, the output value may be generated as if different polynomials which differ in the sense that they are extended around the different center points were used. In doing so, the prescribed accuracy of the function may be achieved for an input range of the function in which the center points lie. It is understood that the input value of the function may lie in the input range. In one example, the center points may be equally distributed within the input range. In one example, the determining of the output value dependent on the polynomials may comprise computing a linear combination of the polynomials.

Furthermore, in providing the precomputed terms, these terms do not need to be computed in response to receiving the input value. Hence, computational time may be saved by loading the precomputed terms instead of computing them anew in order to determine the output value of the function. This may reduce the computational cost for the training or the inference of the FHE AI-module, in particular the FHE transformer-based AI-module. In one example, the precomputed terms may be provided by storing the precomputed terms in a caching device of the computer system.

In one example, the input value may be an internal value of the AI-module determined dependent on an input dataset of the AI-module. It is understood that the proposed method may involve determining several output values of a set of functions of the AI-module, wherein the set of functions may comprise the above mentioned function and further functions which may each approximate a respective further non-linear function of the AI-module. The respective further function of the set of functions may be constructed in a similar manner as the function described above and/or similar to the variants of the function mentioned below. In one example, all non-linear functions of the AI-module may be approximated by the set of functions.

In one example, the respective polynomial may depend on a set of powers for the respective polynomial. The powers of the respective set may depend each on the difference between the input value and the center value associated to the respective polynomial as a basis of the respective power and on a natural number as an exponent of the respective power. The natural numbers may increase from power to power of the respective polynomial.

In most applications a value of the difference between the input value and the respective center value may lie between −1 and 1, wherein the numbers −1 and 1 may refer to a plaintext domain. Hence, raising the basis of the respective power to the natural number of the respective power may result in a value of the respective power which is equal or less than the respective difference as the respective basis because the exponent of the respective power is the respective natural number, for example one, two, three and so forth. The natural numbers may start from one. As the natural numbers may increase from power to power of the respective polynomial, the value of the respective power may decrease from power to power of the respective polynomial. The higher the degree of the respective power, the smaller the value of the respective power may be. Hence, the powers may be used for adapting the accuracy of the approximation of the non-linear function.

Thus, by having the respective polynomial depending on the set of the powers the accuracy of the approximation of the non-linear function may be adjustable such that it may satisfy the prescribed accuracy. Hence, the powers may provide flexibility in order to satisfy the prescribed accuracy. This may allow to reduce noise generated with each computation when applying the function in the FHE AI-module. The accuracy of the approximation of the non-linear function may be prescribed by that power of the set of powers for the respective polynomial whose exponent is the greatest. The polynomials may be all expanded to the same degree.

In one example, the respective polynomial may depend on a set of products for the respective polynomial. The respective product of the respective set may comprise one of the precomputed terms and one of the powers of the respective set of powers as factors. By multiplying one of the precomputed terms and one of the powers together, the respective polynomial may resemble a Taylor polynomial. As Taylor polynomials are known for their ability to approximate any function to an arbitrary degree of accuracy, this may allow to approximate the non-linear function with a higher accuracy. This may further reduce noise generated with each computation when applying the function in the FHE AI-module.

In one example, the precomputed terms may depend on derivatives of the non-linear function evaluated at the center points. This may allow to calculate the output value in a manner which may resemble a Taylor approximation of the non-linear function. Hence, this may allow to approximate the non-linear function with an even greater accuracy. In one example, the respective polynomial may depend on a set of derivatives of the non-linear function evaluated at the respective center point associated to the respective polynomial. Each derivative of the set of derivatives may be evaluated at the respective center point associated to the respective polynomial. An order of the derivative of the respective set of derivatives may increase from derivative to derivative. The derivatives may be precomputed and may be part of the precomputed terms. This may speed up computing time during the training and the inference of the AI-module.

In one example, the respective polynomial may represent a respective Taylor polynomial for the non-linear function. The respective Taylor polynomial may be centered at the respective center value which is associated to the respective polynomial.

The respective Taylor polynomial may approximate the non-linear function near the respective center point. The respective Taylor polynomial may be developed around the respective center point. As the polynomials do not comprise an infinite number of terms, the respective Taylor polynomial may only form a part of a respective Taylor series approximating the non-linear function near the respective center point. This example may be considered as that variation of the polynomials which resemble the most the respective Taylor series developed around the respective center point. Therefore, this may allow to enhance the accuracy of the approximation of the non-linear function even further.

In one example, the calculating of the output value of the function may comprise evaluating a linear combination of the polynomials. By that, the output value of the function may be obtained in the form of an average of the different polynomials. As the polynomials are centered each around a different one of the center points, averaging may provide an efficient manner to provide an accuracy of the approximation of the non-linear function which may match the prescribed accuracy in case the input value lies within the range in which the center values lie.

In one example, the non-linear function may be the Gaussian Error Linear Unit (GELU) function. The GELU function may be an activation function of neurons of the neural network of the AI-module. The GELU function smoothly combines the ReLU and sigmoid behaviors. Instead of making a hard cutoff like ReLU, which sets negative values to zero, the GELU function may allow negative values to pass through but may scale them down. This may allow to compute derivatives in order to develop the polynomials in the form of Taylor polynomials for the GELU function. In one example, the GELU function may be in the form of $$GELU(x) = 0.5 \times \left(1 + \tanh\left[(\pi/2)0, 5(x + 0.044715 \times 3)\right]\right)$$

wherein "x" may represent the input value.

In one example, the non-linear function may be an exponential function of the softmax function. The softmax function is a mathematical function that transforms a vector of real numbers into a probability distribution. Below are the formulas for the softmax function. For a vector $z=[z_1, z_2, \ldots, z_n]$, the AI-module may be configured to apply the softmax function such that $$\text{softmax}(z_i) = e^\wedge(z_i)/\sum_j [e^\wedge(z_j)], \text{ for } i = 1, 2, \ldots, n \text{ and } j = 1, 2, \ldots, n,$$

wherein "e" indicates the exponential function. Properties of the softmax function may be that $\text{softmax}(z_i) \in [0, 1]$ for all i and that the sum over all $\text{softmax}(z_i)$ is equal to 1. In one example, the input value may be one of the entries of the vector z. Thus, in case the non-linear function is the exponential function of the softmax function, the AI-module may be configured to apply the function multiple times on a set of input values for the function for realizing the softmax function. The input value may be one of the input values of the set of input values. The input values of the set of input values may be presented as input to the function one after the other.

In one example, the determining of the output value of the function dependent on the polynomials and the precomputed terms may comprise providing a combined polynomial. The combined polynomial may result from combining terms having the same natural number as an exponent. The terms may result from expanding the respective set of powers of the respective polynomial and arranging the expanded sets of powers together in the form of a single mathematical expression. The combining of the terms may comprise combining like terms of the terms. The single mathematical expression may be in the form of the linear combination of the polynomials. The combined polynomial may be considered as a single aggregated polynomial. In this example, the polynomials may be considered to be aggregated in the form of the single aggregated polynomial, i.e. the combined polynomial.

The combined polynomial may comprise the precomputed terms and further terms. The precomputed terms may comprise the above mentioned derivatives. The further terms may depend on the input value and may comprise the natural numbers as an exponent. In one example, the further terms may comprise the input value or the respective center value as a basis.

The calculating of the output value of the function dependent on the polynomials and the precomputed terms may further comprise evaluating the further terms dependent on the input value.

Furthermore, the calculating of the output value of the function dependent on the polynomials and the precomputed terms may comprise calculating the output value as a result of evaluating the combined polynomial on the basis of the precomputed terms and the evaluated further terms. In this case, a computation of the output value dependent on the polynomials may be performed by evaluating the combined polynomial on the basis of the precomputed terms and the evaluated further terms. Performing the calculation of the output value by evaluating the combined polynomial instead of evaluating the polynomials one by one and adding a respective result of the evaluation of the respective polynomial may speed up the determining of the output value of the function.

In one example, the combined polynomial may be provided in the ciphertext domain for computing the encrypted output value of the function dependent on the encrypted input value. In one example, coefficients of the combined polynomial may be encoded each into a respective further cipher polynomial. The term "further cipher polynomial" is used herein to distinguish the further cipher polynomials from the cipher polynomials. The further cipher polynomials may comprise coefficients as well. The coefficients of the further cipher polynomials may be encrypted fully homomorphically applying the exemplary fully homomorphic encryption scheme on the coefficients of the further cipher polynomials resulting in encrypted coefficients of the further cipher polynomials. The encrypted coefficients of the further cipher polynomials may represent the combined polynomial in the ciphertext domain. In one example, the encrypted coefficients of the further cipher polynomials may be part of the precomputed terms.

In one example, the AI-module may be configured to apply homomorphic operations, for example performing summations or convolutions, on the encrypted coefficients of the input polynomial and the encrypted coefficients of the further cipher polynomials. For example, the AI-module may be designed to add the encrypted coefficients of the input polynomial with the encrypted coefficients of the further cipher polynomials. In another example, the AI-module may be designed to perform a convolution of the encrypted coefficients of the input polynomial with the encrypted coefficients of the further cipher polynomials. In addition, the AI-module may be configured to perform a modular reduction to keep a degree of further intermediated polynomials resulting from homomorphic operations between the encrypted coefficients of the input polynomial and the encrypted coefficients of the further cipher polynomials within a prescribed bound.

In one example, the AI-module may be a transformer-based Large Language Model (LLM). As transformer-based LLMs are widely used, the AI-module being the transformer-based LLM equipped with the function represented by the combined polynomial may present a solution for applying transformer-based LLMs to encrypted data, such as the encrypted input value, while keeping a computing time for computing the output of the transformer-based LLM within a reasonable limit.

In one example, the function may be a function of an attention module of the transformer-based LLM. The attention module may be a self-attention module or a cross-attention module. Attention modules are widely used in transformer-based LLMs. Attention modules may allow to project internal embedding vectors computed on the basis on the input dataset of the AI-module mentioned above on subspaces and comparing the projected internal vectors among each other. This may allow to develop an internal understanding of a problem presented by the input dataset. As such a capability is crucial for modern transformer-based LLMs, attention modules may present one of the most important ingredients of modern transformer-based LLMs. The function being a function of an attention module of the transformer-based LLM may allow to speed up a computation of an output of the transformer-based LLM in the ciphertext domain.

In one example, the method may further comprise receiving a first encrypted input. In one example, the first input may be provided as an input to the AI-module. The first input may be in the form of a first phrase, for example a first question phrase, in particular in case the AI-module is designed in the form of the LLM, for example in the form of the transformer-based LLM. In one example, the first encrypted input may be provided in the form of encrypted coefficients of first input polynomials.

The method may further comprise determining, using the AI-module, fully homomorphically encrypted entries of first vectors, in particular of first key-vectors, first value-vectors and first query-vectors of the attention module of the AI-module, in the form of fully homomorphically encrypted coefficients of first further polynomials dependent on the first input. The encrypted coefficients of a respective one of the first further polynomials may represent a ciphertext of a respective one of the entries of the first vectors in plaintext.

In one example, the AI-module may be configured to divide the first input into first input tokens and to generate a first input embedding vector for each first input token, in particular by using an embedding module of the AI-module. The AI-module may be configured to generate a set of first input embedding polynomials dependent on the encrypted coefficients of first input polynomials. The set of the first input embedding polynomials may be represented as ciphertext in the form of encrypted coefficients of the first input embedding polynomials.

Furthermore, the AI-module may be designed to project the first input embedding vectors into a respective subspace. The AI-module may be designed to perform the projections by vector-matrix multiplications using projection matrices, for example a query projection matrix, a key projection matrix and a value projection matrix. The first vectors may result from these projections. In case the first vectors comprise the first key-vectors, first value-vectors and first query-vectors, there may be three subspaces. In the plaintext domain, the first key-vectors may be represented as a first key-matrix, the first value-vectors may be represented as a first value-matrix, and the first query-vectors may be represented as a first query-matrix.

In the ciphertext domain, the first vectors may be represented in the form of first tensors. For example, the first key-vectors may be represented in the ciphertext domain as a first key-tensor, the first value-vectors may be represented in the ciphertext domain as a first value-tensor, and the first query-vectors may be represented as a first query-tensor in the ciphertext domain. Entries of the first tensors, such as the first key-tensor, the first value-tensor and the first query-tensor, may each be designed in the form a respective one of the encrypted coefficients of the first further polynomials. As each entry of the first vectors may be represented in the form a set of coefficients of the first further polynomials, the first tensors may comprise at least one dimension more than the first vectors. In case the first key-vectors are represented together in the ciphertext domain in the form of the first key-tensor, the first key-tensor may comprise two dimensions more than a single first key-vector.

The AI-module may be designed to compute the encrypted coefficients of the first further polynomials through performing a convolution of the encrypted coefficients of the first input embedding polynomials with encrypted projection matrix coefficients, which represent entries of the projection matrices. The entries of the projection matrices may be represented in the form of projection polynomials. Thus, the projection matrix coefficients, which represent the entries of the projection matrices, may be coefficients of the projection polynomials.

Generally, the representation of the entries through the encrypted coefficients of the first input embedding polynomials, the first further polynomials and the projection polynomials may be considered as a representation of the entries of the first input embedding vectors, the first vectors and the projection matrices in ciphertext. The encrypted coefficients of the first input embedding polynomials and the projection polynomials may be obtained by encrypting the coefficients of the first input embedding polynomials and the projection polynomials using the exemplary FHE scheme mentioned above.

The method may further comprise storing a part of the first vectors, in particular the first key-vectors and the first value-vectors, in the form of a part of the first tensors. For example, the AI-module may be configured to store the first key-tensor and the first value-tensor. The entries of the part of the first tensors may comprise the coefficients of a part of the first further polynomials which is associated to the part of the first vectors.

The method may further comprise determining the input value of the function dependent on the entries of the first vectors. This may comprise a variant, according to which the input value is part of the set of input values for the function and the function approximates the exponential function of the softmax function, in particular of a softmax function of the attention module of the AI-module.

For example, and for simplicity the plaintext domain is considered here, the AI-module may be configured to compute the input value as a result of a multiplication of one of several columns of the first key-matrix with one of several rows of the first query-matrix. In one example, and for simplicity the plaintext domain is considered here, the AI-module may be designed to compute the respective input value of the set of input values by performing a multiplication of the respective column of the first key-matrix with the respective row of the first query-matrix.

The AI-module may be arranged to realize these multiplications in the ciphertext domain by performing convolutions of the entries of the first key-tensor with the entries of the first query-tensor. As described above, the input value may be represented in the form of the input polynomial, wherein the coefficients of the input polynomial are encrypted. Analogously, the set of input values may be represented in the form of input polynomials, wherein coefficients of the input polynomials are encrypted. The input polynomials may comprise the input polynomial.

The AI-module may be configured to determine the output value of the function dependent on the input value. For realizing this, the AI-module may determine the output value of the function as the result of evaluating the combined polynomial according to one of the variants described above. In case, the function approximates the exponential function of the softmax function, the evaluating of the combined polynomial may be applied multiple times dependent on the respective input value of the set of input values in order to apply the softmax function.

In one example, and for simplicity the plaintext domain is considered here, the set of input values may be represented in the form an input matrix, whose elements may be the input values of the set of input values. Following this example, the AI-module may apply the softmax function column-wise on the elements of the input matrix or row-wise on the elements of the input matrix resulting in an output matrix. The function may be applied multiple times for obtaining each element of the output matrix as a result of the softmax function. In doing so, the function may be applied for each input value of the set of input values one by one resulting in a set of output values of the function. The respective output value of the function may approximate a function value of the exponential function dependent on the respective input value of the set of input values. The AI-module may be configured to apply the softmax function given above dependent on the output values of the set of output values of the function. In the following, the output matrix may be referred to as the softmax matrix.

The AI-module may be configured to apply homomorphic mathematical operations, for example summations or convolutions, on the encrypted coefficients of the input polynomials to compute entries of the softmax matrix in the ciphertext domain. The entries of the softmax matrix may be represented each in the form of encrypted coefficients of softmax polynomials. Thus, in the ciphertext domain, the softmax matrix may be represented in the form of a softmax-tensor. Entries of the softmax-tensor may be the encrypted coefficients of the softmax polynomials.

The method may further comprise determining a first output of the AI-module dependent on the output value of the function. The first output of the AI-module may be determined dependent on the softmax matrix. As the output matrix depends on the output value of the function, the first output of the AI-module may depend on the output value of the function as well in this case. In one example, and for simplicity the plaintext domain is considered here, the AI-module may be configured to generate linear combinations of the first value-vectors using entries of the softmax matrix as linear factors resulting in first contextualized embedding vectors. The respective first contextualized embedding vector may result from a respective linear combination of the first value-vectors using entries of one respective column of the softmax matrix as linear factors. The AI-module may be arranged to generate the first contextualized embedding vectors in the ciphertext domain by performing convolutions of the entries of the first value-tensor with the entries of the softmax-tensor.

In an exemplary application, the first output of the AI-module may be in the form of a first answer phrase, in particular in case the AI-module is the LLM, for example the transformer-based LLM. The AI-module may be configured to generate the first answer phrase dependent on the first contextualized embedding vectors using the embedding module. In one example, the embedding module may be designed to associate a token to a respective embedding vector and vice versa.

The method may further comprise receiving a second encrypted input. The second input may be provided as updated input to the AI-module. The second input may be a second question phrase. In one example, the second encrypted input may be provided in the form of encrypted coefficients of second input polynomials.

The method may further comprise determining, using the AI-module, second vectors, in particular second key-vectors, second value-vectors and second query-vectors of the attention module, dependent on the second input. The AI-module may be configured to generate the second vectors analogously to the first vectors, but using the second input instead of the first input. For example, the AI-module may be designed to generate fully homomorphically encrypted entries of the second vectors, in particular of the second key-vectors, second value-vectors and second query-vectors, in the form of fully homomorphically encrypted coefficients of second further polynomials dependent on the second input. The encrypted coefficients of the second further polynomials may represent the entries of the second vectors in ciphertext.

In one example, the AI-module may be configured to divide the second input into second input tokens and to generate a second input embedding vector for each second input token, in particular by using the embedding module of the AI-module. The AI-module may be configured to generate a set of second input embedding polynomials dependent on the encrypted coefficients of the second input polynomials. The set of the second input embedding polynomials may be represented as ciphertext in the form of encrypted coefficients of the second input embedding polynomials.

Furthermore, the AI-module may be designed to project the second input embedding vectors into the respective subspace. The AI-module may be designed to perform the projections of the second input embedding vectors by vector-matrix multiplications using the projection matrices, for example the query projection matrix, the key projection matrix and the value projection matrix. The second vectors may result from these projections. In the plaintext domain, the second key-vectors may be represented as a second key-matrix, the second value-vectors may be represented as a second value-matrix, and the second query-vectors may be represented as a second query-matrix.

In the ciphertext domain, the second vectors may be represented in the form of second tensors. For example, the second key-vectors may be represented as a second key-tensor, the second value-vectors may be represented as a second value-tensor, and the second query-vectors may be represented as a second query-tensor. Entries of the second tensors, such as the second key-tensor, the second value-tensor and the second query-tensor, may each be designed in the form a respective one of the encrypted coefficients of the second further polynomials.

The AI-module may be designed to compute the encrypted coefficients of the second further polynomials through performing a convolution of the encrypted coefficients of the second input embedding polynomials with the encrypted projection matrix coefficients, which represent entries of the projection matrices.

The method may further comprise determining a second input value of the function dependent on the stored first tensors and the second vectors. Following the example given above according to which the function may approximate the exponential function of the softmax function of the attention module, the second input value may be part of a second set of input values for the function and the function may be applied on the input values. The input values of the second set of input values may be presented as input to the function one after the other.

In one example, the AI-module may be configured to assemble the stored first tensors with a part of the second tensors for computing the second input value dependent on the stored first tensors and the second vectors. As the second tensors may represent the second vectors in ciphertext, computing the second input value dependent on the stored first tensors and the second vectors may be considered as computing the second input value dependent on the stored first tensors and the second tensors.

In one example, the AI-module may assemble the first key-tensor with the second key-tensor resulting in a combined key-tensor, for example by appending the second key-tensor to the first key-tensor. Similarly, the AI-module may assemble the first value-tensor with the second value-tensor resulting in a combined value-tensor, for example by appending the second value-tensor to the second value-tensor. Such an assembling may be represented in the plaintext domain as an assembling of the first key-matrix with the second key-matrix resulting in a combined key-matrix and an assembling of the first value-matrix with second value-matrix resulting in a combined value-matrix.

In one example, and for simplicity the plaintext domain is considered here, the AI-module may be configured to compute the second input value as a result of a multiplication of one of several columns of the assembled key-matrix with one of several rows of the second query-matrix. In one example, and for simplicity the plaintext domain is considered here, the AI-module may be designed to compute the respective input value of the second set of input values by performing a multiplication of the respective column of the assembled key-matrix with the respective row of the second query-matrix.

The AI-module may be arranged to realize these multiplications in the ciphertext domain by performing convolutions of the entries of the assembled key-tensor with the entries of the second query-tensor. As described above, the second input value may be represented in the form of the second input polynomial, wherein the coefficients of the second input polynomial are encrypted. Analogously, the second set of input values may be represented in the form of second input polynomials, wherein coefficients of the second input polynomials are encrypted. The second input polynomials may comprise the second input polynomial.

The AI-module may be configured to determine the second output value of the function dependent on the second input value. For realizing this, the AI-module may determine the second output value of the function as the result of evaluating the combined polynomial according to one of the variants described above with the second input value as the input of the function. The evaluating of the combined polynomial may be applied multiple times dependent on the respective input value of the second set of input values in order to apply the softmax function.

In one example, and for simplicity the plaintext domain is considered here, the second set of input values may be represented in the form a second input matrix, whose elements may be the input values of the second set of input values. Following this example, the AI-module may apply the softmax function column-wise on the elements of the second input matrix or row-wise on the elements of the second input matrix resulting in a second output matrix. The function may be applied multiple times for obtaining each element of the second output matrix as a result of the softmax function. In doing so, the function may be applied for each input value of the second set of input values one by one resulting in a second set of output values of the function. The respective second output value of the function may approximate a function value of the exponential function dependent on the respective input value of the second set of input values. The AI-module may be configured to apply the softmax function given above dependent on the output values of the second set of output values of the function. In the following, the second output matrix may be referred to as the second softmax matrix.

The AI-module may be configured to apply homomorphic mathematical operations, for example summations or convolutions, on the encrypted coefficients of the second input polynomials to compute entries of the second softmax matrix in the ciphertext domain. The entries of the second softmax matrix may be represented each in the form of encrypted coefficients of second softmax polynomials. Thus, in the ciphertext domain, the second softmax matrix may be represented in the form of a second softmax-tensor. Entries of the second softmax-tensor may be the encrypted coefficients of the second softmax polynomials.

The method may further comprise determining a second output of the AI-module dependent on the second output value of the function. The second output of the AI-module may be determined dependent on the second softmax matrix. As the second output matrix depends on the second output value of the function, the second output of the AI-module may depend on the second output value of the function as well in this case.

In one example, and for simplicity the plaintext domain is considered here, the AI-module may be configured to generate linear combinations of the second value-vectors using entries of the second softmax matrix as linear factors resulting in second contextualized embedding vectors. The respective second contextualized embedding vector may result from a respective linear combination of the second value-vectors using entries of one respective column of the second softmax matrix as linear factors. The AI-module may be arranged to generate the second contextualized embedding vectors in the ciphertext domain by performing convolutions of the entries of the second value-tensor with the entries of the second softmax-tensor.

In an exemplary application, the second output of the AI-module may be in the form of a second answer phrase, in particular in case the AI-module is the LLM, for example the transformer-based LLM. The AI-module may be configured to generate the second answer phrase dependent on the second contextualized embedding vectors using the embedding module.

The advantage of storing the first tensors, in particular the first key-tensor and the first value-tensor, is that information obtained by computing the first output of the AI-module may be used for computing the second output of the AI-module. In case the first key-tensor and the first value-tensor was not stored, all the entries of the assembled key-tensor and of the assembled value-tensor would have to be computed anew for generating the second output of the AI-module. In this case, the first input would also have to be provided as the input to the AI-module for computing the second output of the AI-module. The storing of the first key-tensor and the first value-tensor may also be considered as a KV-caching of coefficients of polynomials in an FHE environment. As applying the AI-module on encrypted data may require more computational steps compared to an application on decrypted data, the KV-caching of the first key-tensor and the first value-tensor may allow to reduce the number of the required computational steps. Thus, an overall time efficiency of the AI-module may be improved.

In one example, the method may further comprise providing a caching device for storing the first tensors. The caching device may be a caching device of the computer system, for example an L3- or L4 cache. In one example, the caching device may be a shared caching device shared by two or more processors of a set of processors. The set of processors may be arranged on a single chip. In one example the caching device may be the cache 821 mentioned below and the set of processors may the below mentioned processors set 810. The method may further comprise dividing the first tensors, in particular the first key-tensor and the first value-tensor, into chunks of the first tensors. The method may further comprise storing the chunks in memory blocks of the caching device. The blocks may be accessible independently from each other for reading out the chunks of the first tensors independently from each other. In one example, the AI-module may be configured to allocate the blocks in the caching device independently from each other such that the blocks are accessible independently from each other for writing the chunks into the blocks and reading out the chunks separately from each other from the blocks.

The AI-module may comprise a block table which comprises a mapping between the chunks of the first tensors and the blocks in which the chunks are stored. The blocks may be accessible independently using the block table. The block table may be designed in the form of a lookup table in one example.

In one example, chunks of different tensors of the first tensors may be stored in one common block of the blocks. The blocks may also be referred to as pages.

In one example, a first page may store a first part of the first key-tensor and a first part of the first value-tensor. A second page may store a second part of the first key-tensor and a second part of the first value-tensor. That may allow a flexible computation of the above mentioned second softmax matrix and/or the second contextualized embedding vectors. In one example, the block table may comprise an information about a number of filled positions of the respective block. This may enable to fill gaps of the blocks, such that a risk of a fragmentation of the caching device may be reduced.

In one example, the method may further comprise allocating the memory blocks non-contiguously in the device. That may mean that the blocks may be allocated anywhere in the caching device without the restriction that a logical internal order of the first tensors may be preserved. This may further reduce the risk of the fragmentation of the caching device. In addition, allocating the memory blocks non-contiguously in the device may allow to leave gaps between the blocks which store the first tensors.

Instead of allocating large contiguous blocks of the caching device for caching the first key-tensors and the first value-tensors, a memory of the caching device is divided into the smaller, in particular fixed sized, memory blocks, i.e. pages. Each page may be allocated, stored and being accessible independently. This may allow to use the caching device more efficiently, because large contiguous spaces in the caching device do not have to be found for storing the entire first key-tensor and/or the first entire value-tensor. This may be an advantage for a dynamic usage of the AI-module, which may comprise receiving more than just the second input, for example several further inputs one after the other. In addition, this may alleviate a parallel processing of the above mentioned second input matrix on several different CPUs. To realize this, a first part of the second query-tensor and a first part of the first key-tensor may be sent to a first CPU of the computer system and a second part of the second query-tensor and a second part of the first key-tensor may be sent to a second CPU of the computer system. In addition, a distribution of the first tensors between the blocks as described above may allow to load the chunks separately into the first or second CPU.

In case the first tensors were cached in a large contiguous space of the caching device as contiguous data in a single block, a loading of only a fraction of the first tensors, such as the first part of the first key-tensor may not be possible because the first tensors may only be loaded from the single block of the caching device as a whole, i.e. as one single data package. This may limit the AI-module for applications in which a size of the first tensors is limited such that it can be loaded into a single CPU. As a usage of the FHE AI-module goes along with greater sizes of the first tensors compared to a usage with respect to unencrypted data, this may limit the fields of application of the AI-module. Such a limitation may be eliminated by dividing the first tensors into the chunks and storing the chunks in the blocks, where the blocks may be accessible independently from each other for reading out the chunks of the first tensors independently from each other as described above.

Figure 2:
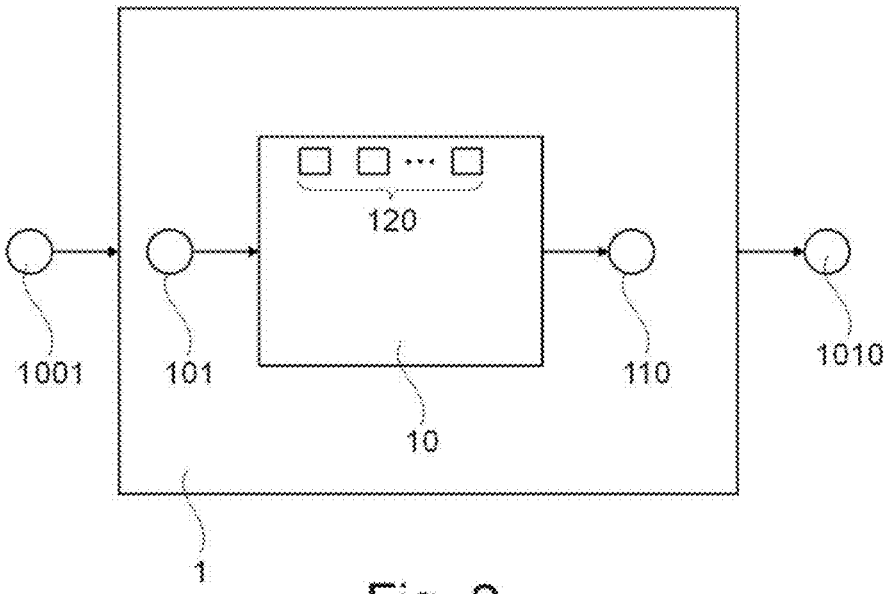
FIG. 2 illustrates a dataflow of the AI-module and a function module of the AI-module.
Figure 10:
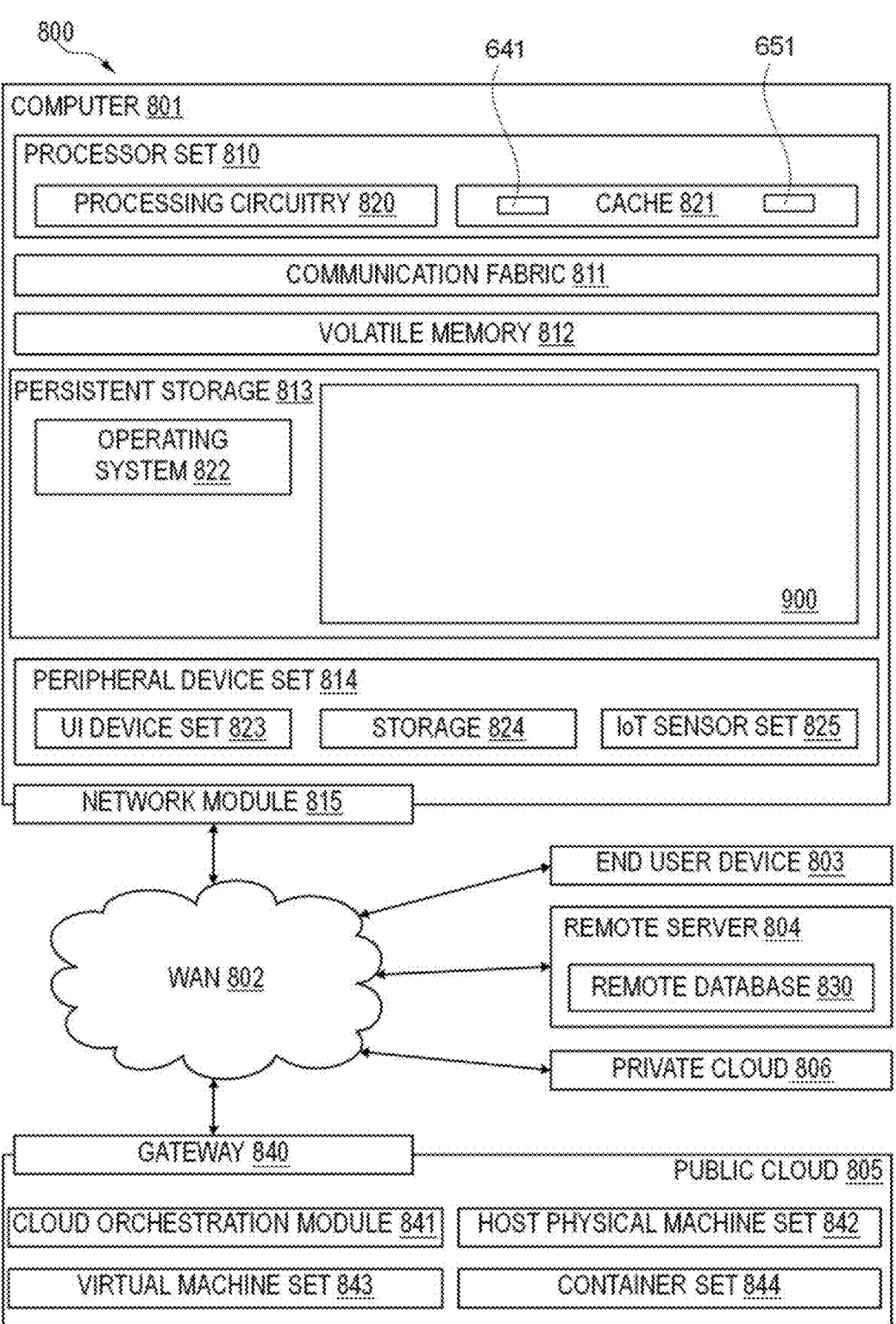
FIG. 10 depicts a computing environment in accordance with an example of the present subject matter.

FIG. 1 is a flowchart of a method for calculating a fully homomorphically encrypted output value of a function of an artificial intelligence module (AI-module), as shown in FIG. 2, dependent on a fully homomorphically encrypted input value of the function in accordance with an example of the present subject matter. For the purpose of explanation, the method described in FIG. 1 may be implemented in the computing environment 800 illustrated in FIG. 10 but is not limited to this implementation.

The method may comprise the following steps. A processor set 810 of the computer 801 shown in FIG. 10 may be configured to perform the steps in the form of operational steps. In step 10001, fully homomorphically encrypted precomputed terms may be provided. The precomputed terms may be independent from the input value. The function may represent a non-linear function to be approximated by the function. In one example, the non-linear function may be the GELU function or the softmax function.

In step 10002, the output value of the function may be calculated dependent on the precomputed terms and on polynomials. The respective polynomial may depend on a difference between the input value and a center value associated to the respective polynomial. The associated center value may indicate a center point at which the respective polynomial is centered. The associated center value may differ from polynomial to polynomial.

FIG. 2 depicts and an AI-module 1, which may be considered as an example of the above-mentioned AI-module. The AI-module 1 may comprise a function module 10 for realizing the function in order to approximate the non-linear function. The function module 10 may be configured to calculate an encrypted output value 110 dependent on an encrypted input value 101. The input value 101 may be considered as an example of the above mentioned input value. Similarly, the output value 110 may be considered as an example of the above mentioned output value. The function module 10 may be configured to compute the output value 110 dependent on fully homomorphically encrypted precomputed terms 120 and the input value 101. The precomputed terms 120 may serve as an example of the above mentioned precomputed terms. Furthermore, the function module 10 may be configured to calculate the output value 110 of the function dependent on the precomputed terms 120 and dependent on polynomials. Thus, the function module 10 may be considered as an example of an implementation of the function in the AI-module 1.

The respective polynomial may depend on a set of powers for the respective polynomial. The powers of the respective set may depend each on the difference between the input value and the center value associated to the respective polynomial as a basis of the respective power and on a natural number as an exponent of the respective power. The natural numbers may increase from power to power of the respective polynomial.

Figure 3:
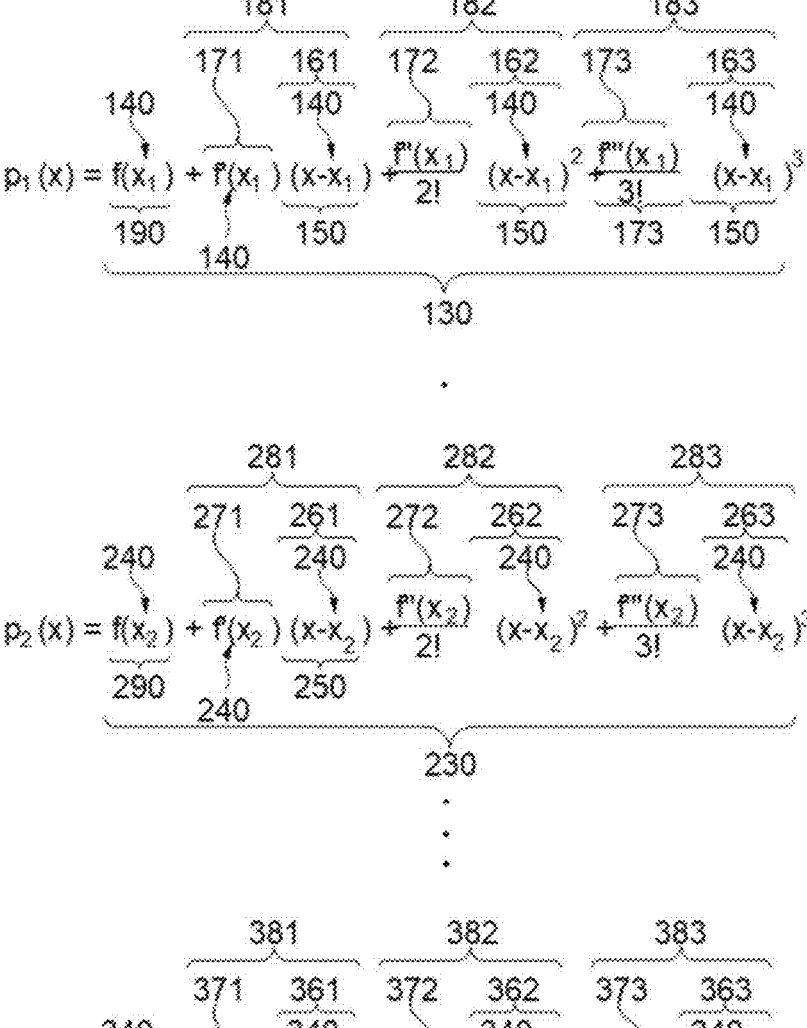
FIG. 3 depicts a set of polynomials.

FIG. 3 shows an example of the polynomials. According to this example, the polynomials may comprise a number of "n" polynomials. FIG. 3 may only show a first polynomial 130, a second polynomial 230 and an n-th polynomial 330 of the polynomials as a way of example. For sake of simplicity, the description of mathematical operations illustrated in FIG. 3, FIG. 4 and FIG. 5 may refer to the plaintext domain. It is understood that the AI-module 1 may be configured to perform these mathematical operation in the ciphertext domain. In order to realize this, the AI-module 1, in particular the function module 10, may be configured to apply homomorphic mathematical operations, such as summations and convolutions, on the encrypted coefficients of the input polynomial, the encrypted coefficients of the cipher polynomials, the encrypted coefficients of the further cipher polynomials and/or the encrypted coefficients of the further polynomials described above.

The first polynomial 130 may depend on a first difference 150 between the input value 101, which is indicated as "x" in FIG. 3, and a first center value 140, which is indicated as x1 in FIG. 3. The first center value 140 may be associated to the first polynomial 130. The first center value 140 may indicate a first center point at which the first polynomial 130 is centered.

The first polynomial 130 may depend on a first set of powers. The first difference 150 may be a basis of the respective power of the first set of powers. A respective natural number of a first set of natural numbers may be equal to an exponent of the respective power of the first set of powers. The natural numbers of the first set of numbers may increase from power to power of the first set of powers. As a way of example, the first set of powers may comprise a first power 161, a second power 162 and a third power 163. The exponent of the first power 161 may be equal to one, the exponent of the second power 162 may be equal to 2 and the exponent of the third power 163 may be equal to 3.

FIG. 3 may also show an example, according to which the first polynomial 130 may depend on a first set of products. According to the example shown in FIG. 3, the first set of products may comprise a first product 181, a second product 182 and a third product 183. The first product 181 may comprise a first coefficient 171 of the first polynomial 130 as a first factor and the first power 161 as a second factor. The second product 182 may comprise a second coefficient 172 of the first polynomial 130 as a first factor and the second power 162 as a second factor. The third product 183 may comprise a third coefficient 173 of the first polynomial 130 as a first factor and third power 163 as a second factor.

In addition to the first set of products, the first polynomial 130 may comprise a first single term 190 which may be equal to a function value of the non-linear function at the first center value 140. The non-linear function to be approximated by the function of the AI-module 1 may be indicated as "f" in FIG. 3. The first polynomial 130 may be constructed as a sum of the first single term 190, the first product 181, the second product 182 and the third product 183.

FIG. 3 also depicts an example, according to which the first polynomial 130 may be in the form of a first Taylor polynomial extended at the first center value 140. In this example, the first coefficient 171 of the first polynomial 130 may be equal to the first derivative of the non-linear function at the first center value 140. Furthermore, according to this example, the second coefficient 172 of the first polynomial 130 may be equal to the quotient of the second derivative of the non-linear function at the first center value 140 as the dividend and 2 factorial as the divisor. The third coefficient 173 of the first polynomial 130 may be equal to the quotient of the third derivative of the non-linear function at the first center value 140 as the dividend and 3 factorial as the divisor.

The second polynomial 230 may depend on a second difference 250 between the input value 101 and a second center value 240, which is indicated as x2 in FIG. 3. The second center value 240 may be associated to the second polynomial 230. The second center value 240 may indicate a second center point at which the second polynomial 230 is centered.

The second polynomial 230 may depend on a second set of powers. The second difference 250 may be a basis of the respective power of the second set of powers. A respective natural number of a second set of natural numbers may be equal to an exponent of the respective power of the second set of powers. The natural numbers of the second set of numbers may increase from power to power of the second set of powers. As a way of example, the second set of powers may comprise a first power 261, a second power 262 and a third power 263. The exponent of the first power 261 may be equal to one, the exponent of the second power 262 may be equal to 2 and the exponent of the third power 263 may be equal to 3.

FIG. 3 may also show an example, according to which the second polynomial 230 may depend on a second set of products. According to the example shown in FIG. 3, the second set of products may comprise a first product 281, a second product 282 and a third product 283. The first product 281 may comprise a first coefficient 271 of the second polynomial 230 as a first factor and the first power 261 as a second factor. The second product 282 may comprise a second coefficient 272 of the second polynomial 230 as a first factor and the second power 262 as a second factor. The third product 283 may comprise a third coefficient 273 of the second polynomial 230 as a first factor and third power 263 as a second factor.

In addition to the second set of products, the second polynomial 230 may comprise a second single term 290 which may be equal to a function value of the non-linear function at the second center value 240. The second polynomial 230 may be constructed as a sum of the second single term 290, the first product 281, the second product 282 and the third product 283.

FIG. 3 also depicts an example, according to which the second polynomial 230 may be in the form of a second Taylor polynomial extended at the second center value 240. In this example, the first coefficient 271 of the second polynomial 230 may be equal to the first derivative of the non-linear function at the second center value 240. Furthermore, according to this example, the second coefficient 272 of the second polynomial 230 may be equal to the quotient of the second derivative of the non-linear function at the second center value 240 as the dividend and 2 factorial as the divisor. The third coefficient 273 of the second polynomial 230 may be equal to the quotient of the third derivative of the non-linear function at the second center value 240 as the dividend and 3 factorial as the divisor.

The n-th polynomial 330 may depend on an n-th difference 350 between the input value 101 and an n-th center value 340, which is indicated as xn in FIG. 3. The n-th center value 340 may be associated to the n-th polynomial 330. The n-th center value 340 may indicate an n-th center point at which the n-th polynomial 330 is centered.

The n-th polynomial 330 may depend on an n-th set of powers. The n-th difference 350 may be a basis of the respective power of the n-th set of powers. A respective natural number of an n-th set of natural numbers may be equal to an exponent of the respective power of the n-th set of powers. The natural numbers of the n-th set of numbers may increase from power to power of the n-th set of powers. As a way of example, the n-th set of powers may comprise a first power 361, a second power 362 and a third power 363. The exponent of the first power 361 may be equal to one, the exponent of the second power 362 may be equal to 2 and the exponent of the third power 363 may be equal to 3.

FIG. 3 may also show an example, according to which the n-th polynomial 330 may depend on an n-th set of products. According to the example shown in FIG. 3, the n-th set of products may comprise a first product 381, a second product 382 and a third product 383. The first product 381 may comprise a first coefficient 371 of the n-th polynomial 330 as a first factor and the first power 361 as a second factor. The second product 382 may comprise a second coefficient 372 of the n-th polynomial 330 as a first factor and the second power 362 as a second factor. The third product 383 may comprise a third coefficient 373 of the n-th polynomial 330 as a first factor and third power 363 as a second factor.

In addition to the n-th set of products, the n-th polynomial 330 may comprise an n-th single term 390 which may be equal to a function value of the non-linear function at the n-th center value 340. The n-th polynomial 330 may be constructed as a sum of the n-th single term 390, the first product 381, the second product 382 and the third product 383.

FIG. 3 also depicts an example, according to which the n-th polynomial 330 may be in the form of an n-th Taylor polynomial extended at the n-th center value 340. In this example, the first coefficient 371 of the n-th polynomial 330 may be equal to the first derivative of the non-linear function at the n-th center value 340. Furthermore, according to this example, the second coefficient 372 of the n-th polynomial 330 may be equal to the quotient of the second derivative of the non-linear function at the n-th center value 340 as the dividend and 2 factorial as the divisor. The third coefficient 373 of the n-th polynomial 330 may be equal to the quotient of the third derivative of the non-linear function at the n-th center value 340 as the dividend and 3 factorial as the divisor.

It is understood, that the polynomials, among them the first polynomial 130, the second polynomial 230 and the n-th polynomial 330, may be expanded to a higher degree than three, as shown in FIG. 3. In one example, the polynomials may be expanded up to the 1024th degree.

In the following example, it may be assumed that the polynomials are expanded up to the second degree for sake of simplicity. According to one variant of this example, the function may be constructed in the form of a combined polynomial 500 shown in FIG. 5. The combined polynomial 500 may result from combining terms of the polynomials having the same natural number as an exponent. The terms of the polynomials may result from expanding the respective set of powers of the respective polynomial and arranging them together in the form of a single mathematical expression 400, shown in FIG. 4. For example, the second power 162 and the third power 163 may be expanded by applying the Binomial Theorem. The expanded sets of powers, such as the first set of powers, the second set of powers and so forth till the n-th set of powers and the respective single tern, such as the first single term 190, the second single term 290 up to the n-th single term 390 may be arranged together in the form of the single mathematical expression 400. The single mathematical expression 400 may comprise a first further product with a first term 121 as a first factor and the input value 101 as the second factor, a second term 122, a second further product comprising a third term 123 as a first factor and the input value 101 squared as a second factor, a fourth term 124 and a third further product with the input value 101 as a first factor and a fifth term 125 as a second factor. The combined polynomial 500 may be obtained by combining like terms of the mathematical expression 400. For example, the second term 122 may be added to the fourth term 124 resulting in a first combined term 501. Similarly, the first term 121 may be added to the fifth term 125 resulting in a second combined term 502. The first combined term 501 may be a first coefficient of the combined polynomial 500. The second combined term 502 may present a second coefficient of the combined polynomial 500. The third term 123 may be considered as a third coefficient of the combined polynomial 500.

According to one example, the function module 10 may be configured to compute the output value 110 by evaluating the combined polynomial 500. The evaluating of the combined polynomial 500 dependent on the input value 101 may comprise adding the first combined term 501 with a product of the second combined term 502 and the input value 101 and with a product of the third term 123 and the input value 101 squared. It may be mentioned that by computing the output value 110 by evaluating the combined polynomial 500 dependent on the input value 101, the output value 110 is still computed dependent on the polynomials, for example dependent on the first polynomial 130, the second polynomial 230 up to the n-th polynomial 330, because the combined polynomial 500 is obtained by a combination of these polynomials. Furthermore, a computation of the output value 110 by evaluating the combined polynomial 500 dependent on the input value 101 may also be dependent on the differences mentioned above, wherein the respective difference may be the difference between the input value 101 and the respective center value associated to the respective polynomial, because the combined polynomial 500 is obtained dependent on the differences.

According to one example, the first combined term 501 and the second combined term 502 may be part of the precomputed terms 120 shown in FIG. 2. In one example, the precomputed terms 120 may be stored in the cache 821. The processor set 810 may execute the AI-module 1. An execution of the AI-module 1 may comprise executing the function module 10 may be executed at least one time. The function module 10 may be configured to load the precomputed terms 120, in particular the first combined term 501 and the second combined term 502, from a storage 824 into the cache 821. In one example, the function module 10 may comprise commands for loading the precomputed terms 120 into the cache 821. The function module 10 may be configured to add the first combined term 501 with the product of the second combined term 502 and the input value 101 and with a product of the third term 123 and the input value 101 squared for obtaining the output value 110.

Figure 6:
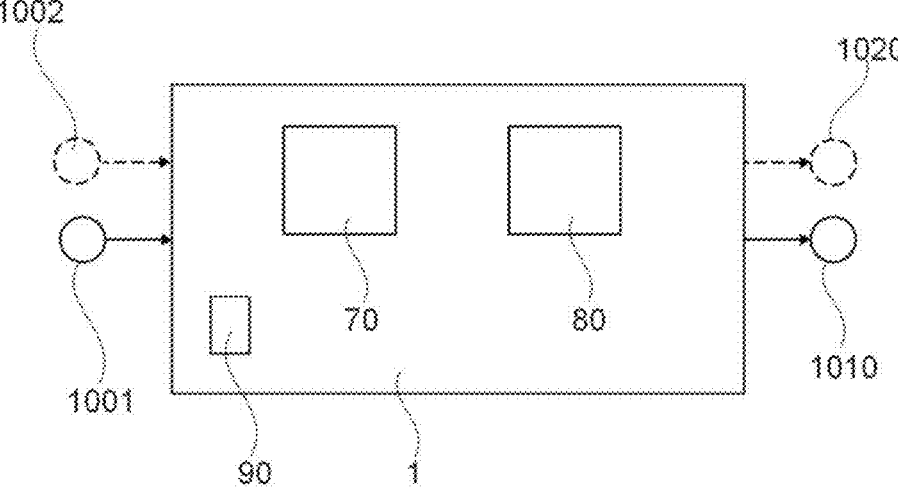
FIG. 6 depicts a dataflow of the AI-module for a repetitive usage.
Figure 7:
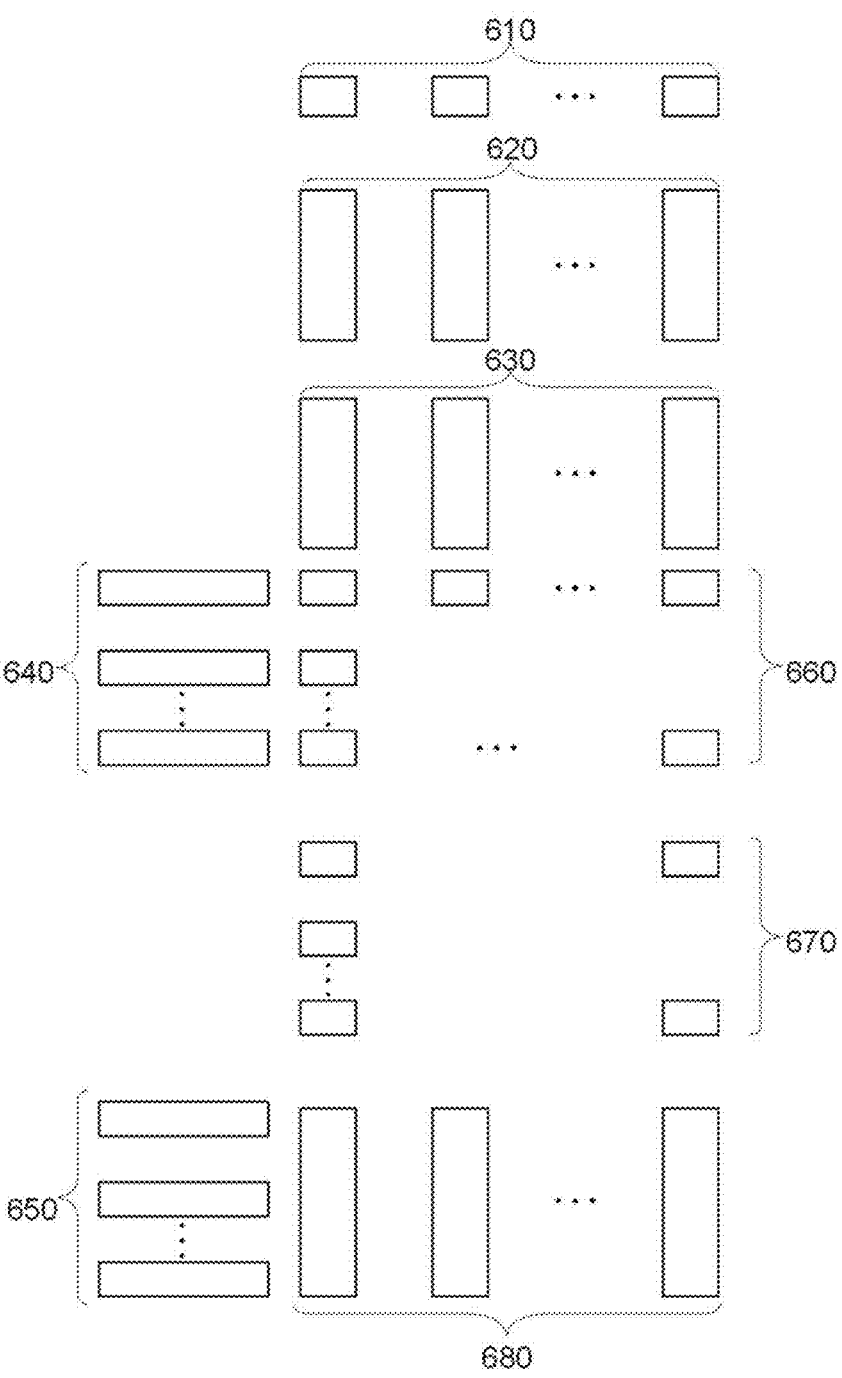
FIG. 7 shows data elements computed in an attention module of the AI-module in a first repetition of a usage of the AI-module.

FIG. 7 shows an example, according to which the AI-module 1 may comprise an attention module 70 and an artificial neural network 80 (ANN 80). The example given in FIG. 6 may also be considered as an example, according to which the AI-module 1 is designed in the form of a transformer-based large language model.

The AI-module 1 may be configured to generate an output 1010 of the AI-module 1 dependent on an input 1001 of the AI-module 1 using the attention module 70, and in particular the ANN 80. In the following, a variant of the function module 10 is described according to which the function module 10 is used to realize the function such that the function approximates a nonlinear function, in particular an exponential function, of the attention module 70.

FIG. 7 illustrates one example of how the processor set 810 may execute the attention module 70. For sake of simplicity, an execution of the attention module 70 is described using vectors and matrixes in order to show the basic principle of the attention module 70 in the plaintext domain.

The AI-module 1 may comprise an embedding module 90 for converting the above mentioned first input into first input tokens 610. The first input tokens 610 may be an example of the above mentioned first input tokens. The first input may be considered as an example of an input 1001 of the AI-module 1 shown in FIG. 2 and in FIG. 6. The embedding module 90 may be configured to generate first input embedding vectors 620 dependent on the first input tokens 610. The first input embedding vectors 620 may be an example of the above mentioned first input embedding vectors.

The attention module 70 may be configured to project the first input embedding vectors 620 into the above mentioned respective subspace. For example, the attention module 70 may multiply the first input embedding vectors 620 with the above mentioned query projection matrix resulting in first query-vectors 630. Furthermore, the attention module 70 may perform a multiplication of the first input embedding vectors 620 with the above mentioned key projection matrix resulting in first key-vectors 640. In addition, the attention module 70 may perform a multiplication of the first input embedding vectors 620 with the value projection matrix resulting in a first value-vectors 650. The AI-module may be configured to initialize a command for storing the first key-vectors 640 and the first value-vectors 650 in a caching device, for example the cache 821, of the computer 801 in response to generating the first key-vectors 640 and the first value-vectors 650. The first key-vectors 640 and the first value-vectors 650 may be stored in ciphertext in the form of a first key-tensor 641 and the first value-tensor 651 into the cache 821. The first key-tensor 641 and the first value-tensor 651 may represent an example of the above mentioned first key-tensor and the first value-tensor respectively.

For sake of clarity, vectors and elements of matrices are shown in the form of rectangles in FIG. 7. In one example, the attention module 70 may be configured to multiply each of the first key-vectors 640 with each of the first query-vectors 630. A respective result of these vector-vector multiplication may be each indicated in the form of a small rectangle representing elements of an input matrix 660. The input matrix 660 may be an example of the above mentioned input matrix.

The attention module 70 may be configured to apply the softmax function column-wise on the input matrix 660 resulting in a softmax matrix 670. The softmax matrix 670 may be an example of the above mentioned softmax matrix. In FIG. 7, elements of the softmax matrix 670 are shown in the form of small rectangles. A respective sum of all elements of one respective column of the columns of the softmax matrix 670 may be equal to one. According to one example, the attention module 70 may send a request to the function module 10 for computing the output value of the function dependent on the input value of the function. The attention module 70 may send the request each time when a calculation of the exponential function may be required in order to execute the softmax function. Thus, the attention module 70 may send several requests. The respective request

Figure 4:
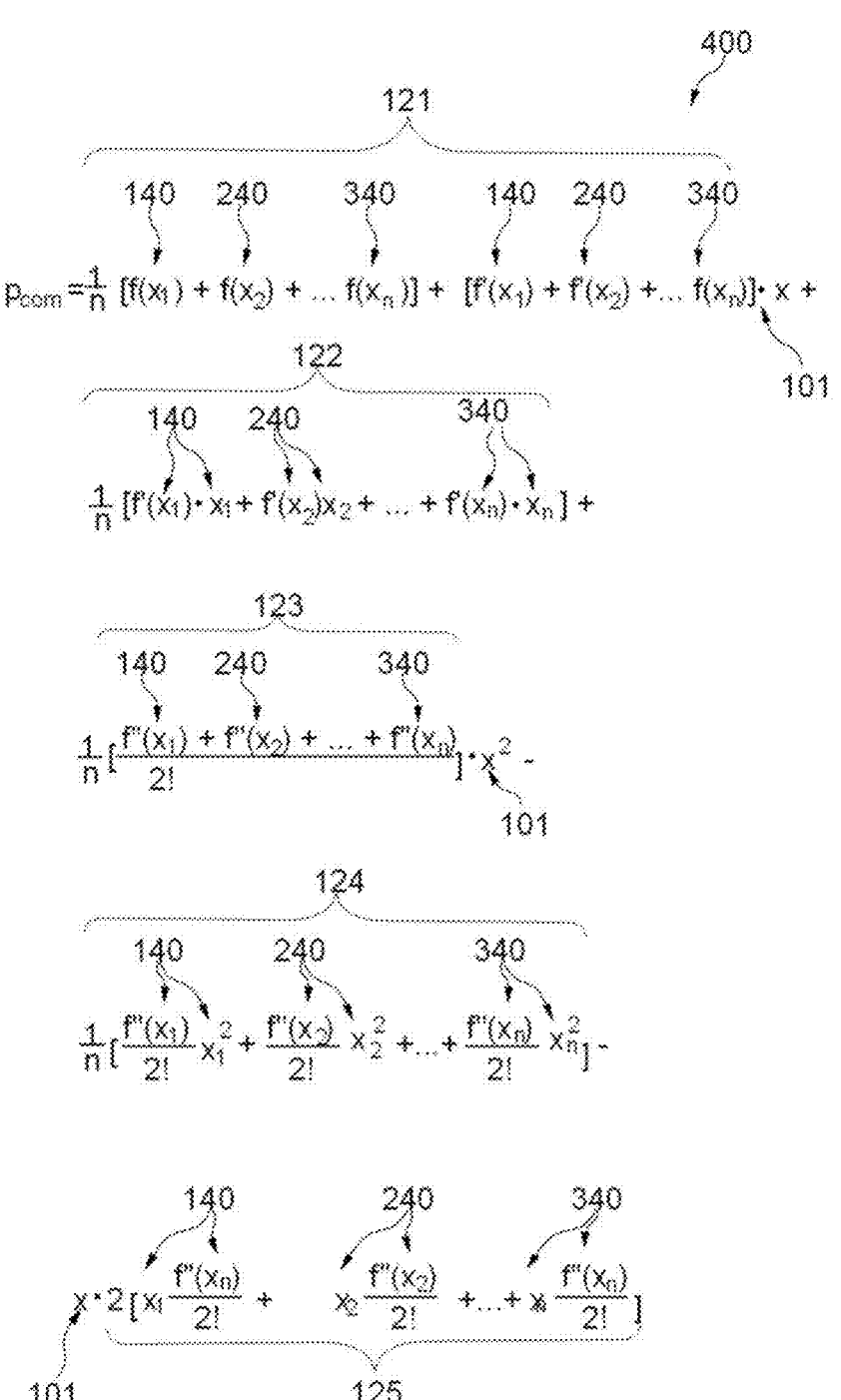
FIG. 4 shows a combined polynomial based on the set of polynomials shown in FIG. 3.
Figure 5:
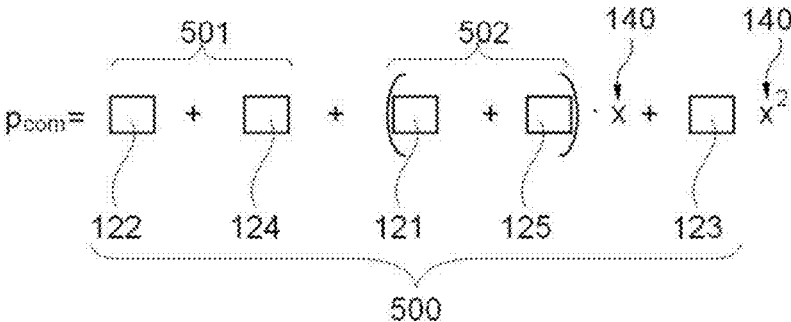
FIG. 5 depicts the combined polynomial shown in FIG. 4 in a shortened variant.

22 may comprise one respective input value of the input matrix 660. The attention module 70 may receive the output value of the function from the function module 10. The function may approximate the exponential function of the above mentioned softmax function. Thus, in this case, the approximated function "ƒ" as depicted in FIG. 3 and FIG. 4 may be the exponential function.

In one example, the attention module 70 may be configured to generate linear combinations of the first value-vectors 650 using entries of the softmax matrix 670 as linear factors resulting in first contextualized embedding vectors 680. The respective first contextualized embedding vector of the first contextualized embedding vectors 680 may result from a respective linear combination of the first value-vectors 650 using entries of one respective column of the softmax matrix 670 as linear factors.

The first contextualized embedding vectors 680 may be an example of the above mentioned first contextualized embedding vectors. In one example, the AI-module 1 may be configured to determine the output 1010 dependent on the first contextualized embedding vectors 680. The output 1010 may be an example of the above mentioned first output of the AI-module. In one example, the AI-module 1 may input the first contextualized embedding vectors 680 or further data, which may be generated dependent on the first contextualized embedding vectors 680, into the ANN 80. In this case, the ANN 80 may be configured to determine the output 1010 dependent on the first contextualized embedding vectors 680 and/or the further data. In one example, activation functions of the ANN 80 may be approximated using a set of further function modules of the AI-module 1 which are not shown in the figures. The functions of the set of further functions may be designed analogously to the function module 10. The function to be approximated by the functions of the set of further functions may be the GELU function. Thus, in this case, the approximated function "ƒ" as depicted in FIG. 3 and FIG. 4 may be the GELU function described above.

In case the AI-module 1 is designed in the form a transformer-based LLM, the AI-module 1 may comprise several further attention modules and several further ANNs. The attention modules may comprise self-attention modules and cross-attention modules. It is assumed that transformer-based LLMs are known and therefore a structure of a transformer-based LLM is not explicitly described.

Figure 8:
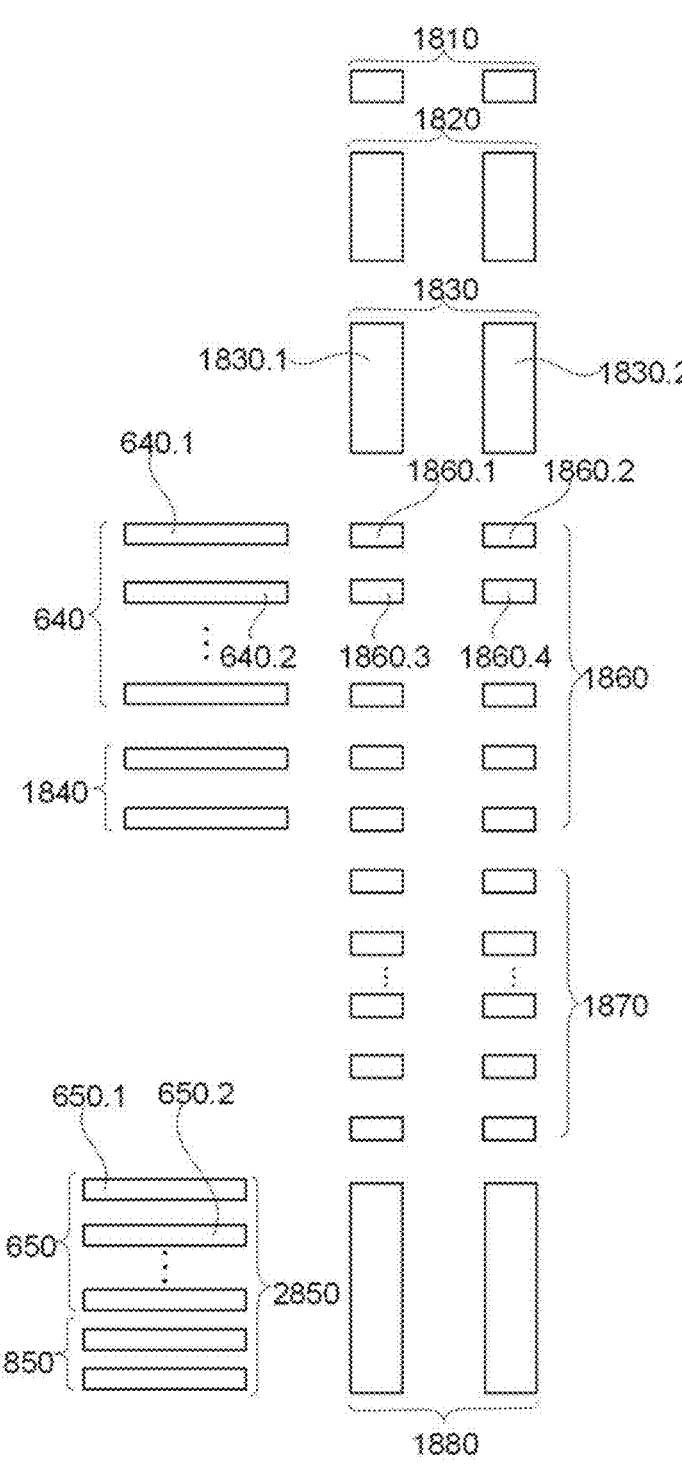
FIG. 8 shows data elements computed in an attention module of the AI-module in a second repetition of a usage of the AI-module.

FIG. 8 illustrates how the AI-module 1 may execute the attention module 70 in response to receiving a second encrypted input 1002 of the AI-module 1 the as shown in FIG. 6 in dashed lines. The embedding module 90 may convert the second input 1002 into second input tokens 1810. The second input tokens 1810 may be an example of the above mentioned second input tokens. The embedding module 90 may be configured to generate second input embedding vectors 1820 dependent on the second input tokens 1810. The second input embedding vectors 1820 may be an example of the above mentioned second input embedding vectors.

The attention module 70 may be configured to project the second input embedding vectors 1820 into the above mentioned respective subspace. For example, the attention module 70 may multiply the second input embedding vectors 1820 with the above mentioned query projection matrix resulting in second query-vectors 1830. Furthermore, the attention module 70 may perform a multiplication of the second input embedding vectors 1820 with the above mentioned key projection matrix resulting in second key-vectors 1840. In addition, the attention module 70 may perform a multiplication of the second input embedding vectors 1820 with the value projection matrix resulting in a second value-vectors 1850.

For sake of clarity, vectors and elements of matrices are shown in the form of rectangles in FIG. 8. In one example, the attention module 70 may be configured to multiply each of the second query-vectors 1830 with each of the second key-vectors 1840 and with each of the first key-vectors 640. In order to realize these multiplications in the ciphertext domain, the AI-module 1 may use the first key-tensor 641 which is stored in the cache 821 and the above mentioned second query-tensor and second key-tensor. The second query-tensor may represent the second query-vectors 1830 in the ciphertext domain as described above. Similarly, the second key-tensor may represent the second key-vectors 1840 in the ciphertext domain. A respective result of this respective vector-vector multiplication may be each indicated in the form of a small rectangle representing a respective element of a second input matrix 1860. The AI-module, in particular the attention module 70, may be configured to perform these vector-vector multiplications in the ciphertext domain by performing the above mentioned convolutions of the entries of the second query-tensor with the entries of the first key-tensor 641 and second key-tensor.

The attention module 70 may be configured to apply the softmax function column-wise on the second input matrix 1860 resulting in a second softmax matrix 1870. The second softmax matrix 1870 may be an example of the above mentioned second softmax matrix. In FIG. 8, elements of the second softmax matrix 1870 are shown in the form of small rectangles. A respective sum of all elements of one respective column of the columns of the second softmax matrix 1870 may be equal to one. According to one example, the attention module 70 may send a request to the function module 10 for computing the output value of the function dependent on the input value of the function. The attention module 70 may send the request each time when a calculation of the exponential function may be required in order to execute the softmax function for determining the second softmax matrix 1870. Thus, the attention module 70 may send several requests. The respective request may comprise one respective input value of the second input matrix 1860. The attention module 70 may receive the output value of the function from the function module 10. The function may approximate the exponential function of the above mentioned softmax function.

In one example, the attention module 70 may be arranged to generate a combined set of value-vectors 2850 comprising the first value-vectors 650 and the second value-vectors 1850. For example, the attention module 70 may concatenate the first value-vectors 650 with the second value-vectors 1850 resulting in the combined set of value-vectors 2850.

In one example, the attention module 70 may be configured to generate linear combinations of the combined set of value-vectors 2850 using entries of the second softmax matrix 1870 as linear factors resulting in second contextualized embedding vectors 1880. The respective second contextualized embedding vector of the second contextualized embedding vectors 1880 may result from a respective linear combination of the combined set of value-vectors 2850 using entries of one respective column of the second softmax matrix 1870 as linear factors.

The second contextualized embedding vectors 1880 may be an example of the above mentioned second contextualized embedding vectors. In one example, the AI-module 1 may be configured to determine a second output 1020, shown in dashed lines in FIG. 6, dependent on the second contextualized embedding vectors 1880. The second output 1020 may be an example of the above mentioned second output of the AI-module.

Similarly to the receiving of the second input 1002, further inputs of the AI-module 1 may be received and for each further input a further output of the AI-module may be generated in a respective repetition. In each repetition, a new set of key-vectors, such as the second key-vectors 1840, and a new set of value-vectors, such as the second value-vectors 1850, may be generated and a storing of these vectors in the cache 821 in the ciphertext domain in the form of a new key-tensor and a new value-tensor may be performed analogously to the storing of the first key-tensor 641 and the first value-tensor 651. In doing so, information obtained by processing previous inputs of the AI-module 1 may be used for processing a current input. The first input of the AI-module 1 may be a previous input and the second input of the AI-module 1 may be the current input in this case. As attention mechanisms may have a quadratic complexity with respect a length of the input, the computational requirements for the computer system may be reduced by caching the new key-tensor and a new value-tensor with each repetition.

Figure 9:
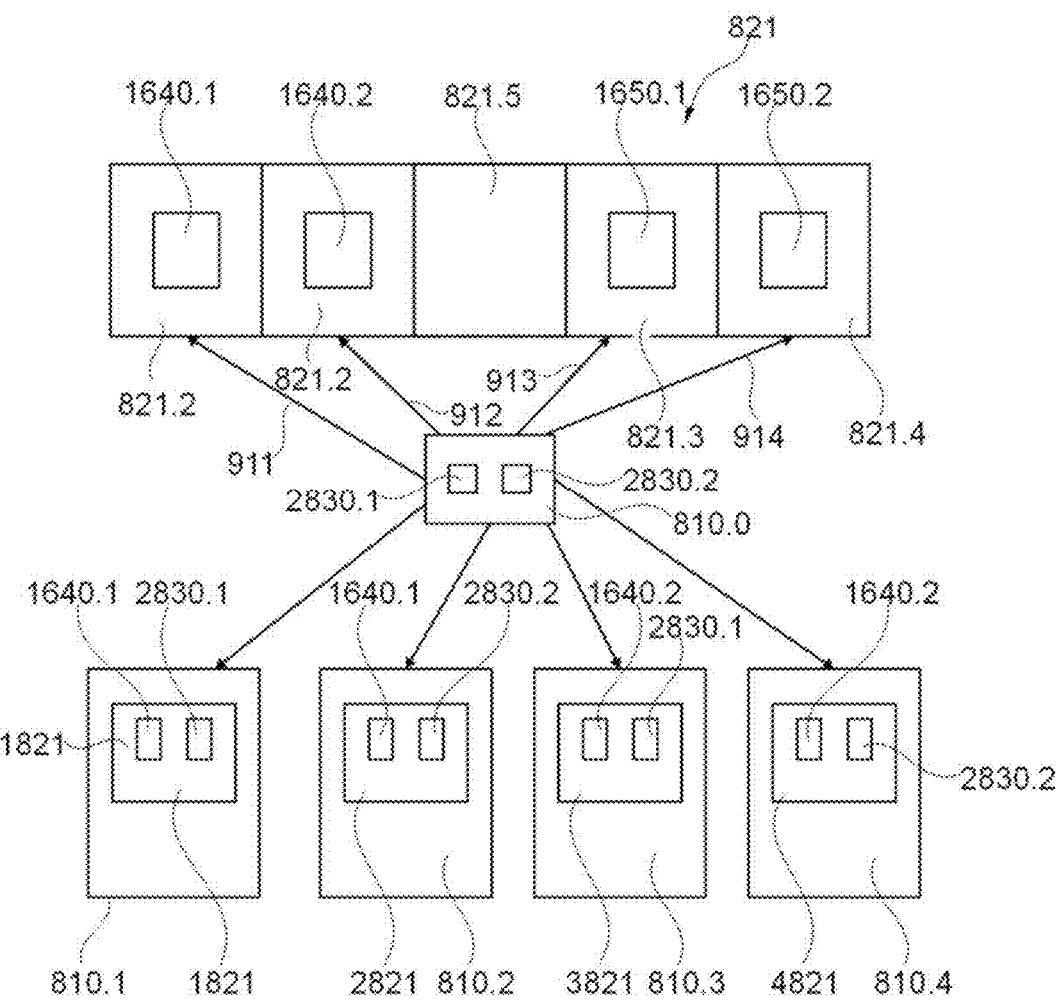
FIG. 9 depicts a variant of how computed data elements of an attention module of the AI-module may be cached in a caching device of a computer system.

FIG. 9 illustrates an example how the entries of the second input matrix 1860 may be computed in parallel using multiple processors of the set of processors 810. In one example, the set of processors 810 may comprise a first processor 810.1, a second processor 810.2, a third processor 810.3 and a fourth processor 810.4. The first processor 810.1 may comprise a first cache 1821, the second processor 810.2 may comprise a second cache 2821, the third processor 810.3 may comprise a third cache 3821 and the fourth processor 810.4 may comprise a fourth cache 4821. The caches 1821, 2821, 3821, 4821 may be individual caches of the processors 810.1, 810.2, 810.3, 810.4, for example in the form of L1 or L2 caches, whereas the cache 821 may be a shared cache of the processors 810.1, 810.2, 810.3, 810.4. The cache 821 may be accessible individually by each one of the processors 810.1, 810.2, 810.3, 810.4, in the following also referred to as thread processors.

In one example, the AI-module 1, in particular the attention module 70, may be configured to allocate different memory blocks of the cache 821 for caching different parts of the first key-tensor and different parts of the first value-tensor.

A first part of the first key-tensor, in the FIG. 9 labelled as 1640.1 and in the following referred to as first key-tensor part 1640.1, may represent a first part of the first key-vectors 640, in FIG. 8 labelled as 640.1 and in the following referred to as first key-vector part 640.1, in the ciphertext domain. The first key-vector part 640.1 may comprise one or more vectors of the first key-vectors 640. The first key-tensor part 1640.1 may comprise a respective set of encrypted coefficients of the above mentioned first further polynomials for each entry of the first key-vector part 640.1.

Analogously, a second part of the first key-tensor, in the FIG. 9 labelled as 1640.2 and in the following referred to as second key-tensor part 1640.2, may represent a second part of the first key-vectors 640, in FIG. 8 labelled as 640.2 and in the following referred to as second key-vector part 640.2, in the ciphertext domain. The second key-vector part 640.2 may comprise one or more vectors of the first key-vectors 640. The second key-tensor part 1640.2 may comprise a respective set of encrypted coefficients of the above mentioned first further polynomials for each entry of the second key-vector part 640.2.

A first part of the first value-tensor, in the FIG. 9 labelled as 1650.1 and in the following referred to as first value-tensor part 1650.1, may represent a first part of the first value-vectors 650, in FIG. 8 labelled as 650.1 and in the following referred to as first value-vector part 650.1, in the ciphertext domain. The first value-vector part 650.1 may comprise one or more vectors of the first value-vectors 650. The first value-tensor part 1650.1 may comprise a respective set of encrypted coefficients of the above mentioned first further polynomials for each entry of the first value-vector part 650.1.

Analogously, a second part of the first value-tensor, in the FIG. 9 labelled as 1650.2 and in the following referred to as second value-tensor part 1650.2, may represent a second part of the first value-vectors 650, in FIG. 8 labelled as 650.2 and in the following referred to as second value-vector part 650.2, in the ciphertext domain. The second value-vector part 650.2 may comprise one or more vectors of the first value-vectors 650. The second value-tensor part 1650.2 may comprise a respective set of encrypted coefficients of the above mentioned first further polynomials for each entry of the second value-vector part 650.2.

A first part of the second query-tensor, in the FIG. 9 labelled as 2830.1 and in the following referred to as first query-tensor part 2830.1, may represent a first part of the second query-vectors 1830, in FIG. 8 labelled as 1830.1 and in the following referred to as first query-vector part 1830.1, in the ciphertext domain. The first query-vector part 1830.1 may comprise one or more vectors of the second query-vectors 1830. The first query-tensor part 2830.1 may comprise a respective set of encrypted coefficients of the above mentioned second further polynomials for each entry of the first query-vector part 1830.1.

Analogously, a second part of the second query-tensor, in the FIG. 9 labelled as 2830.2 and in the following referred to as second query-tensor part 2830.2, may represent a second part of the second query-vectors 1830, in FIG. 8 labelled as 1830.2 and in the following referred to as second query-vector part 1830.2, in the ciphertext domain. The second query-vector part 1830.2 may comprise one or more vectors of the second query-vectors 1830. The second query-tensor part 2830.2 may comprise a respective set of encrypted coefficients of the above mentioned second further polynomials for each entry of the second query-vector part 1830.2.

The first key-tensor part 1640.1, the second key-tensor part 1640.2, the first value-tensor part 1650.1 and the second value-tensor part 1650.2 may be considered as an example of the above mentioned chunks of the first tensors.

The AI-module 1, in particular the attention module 70, may comprise a command for dividing the cache 821 into the memory blocks, for example into a first block 821.1, a second block 821.2, a third block 821.3 and a fourth block 821.4 dependent on predicted memory requirements of the AI-module 1. The AI-module 1 may be configured to specify the predicted memory requirements dependent on the input 1001, for example dependent on the length of the input 1001.

The AI-module 1, in particular the attention module 70, may comprise a command or a set of commands for initializing a caching of the first key-tensor part 1640.1 in the first block 821.1 in response to generating the first key-tensor part 1640.1, for initializing a caching of the second key-tensor part 1640.2 in the second block 821.2 in response to generating the second key-tensor part 1640.2, for initializing a caching of the first value-tensor part 1650.1 in the third block 821.3 in response to generating the first value-tensor part 1650.1, for initializing a caching of the second value-tensor part 1650.2 in the fourth block 821.4 in response to generating the second value-tensor part 1650.2.

FIG. 9 may illustrate an example, according to which the first key-tensor part 1640.1, the second key-tensor part 1640.2, the first value-tensor part 1650.1 and the second value-tensor part 1650.2 may be cached in the memory blocks of the cache 821, wherein the blocks are allocated non-contiguously in the cache 821. An empty block 821.1 of the memory blocks of the cache 821 may have the second block 821.2 and the third block 821.3 as its neighbors. The phrase "blocks are allocated non-contiguously" may also comprise an example, which is not shown in the Figures, according to which the empty block 821.5 is located between two blocks of the caching device storing only two separated parts of the first key-tensor part 1640.1, the second key-tensor part 1640.2, the first value-tensor part 1650.1 or the second value-tensor part 1650.2

A main processor 810.0 of the processor set 810 may be configured to access the blocks 821.1, 821.2, 821.3 and 821.4 individually and to load the first key-tensor part 1640.1, the second key-tensor part 1640.2, the first value-tensor part 1650.1 and the second value-tensor part 1650.2 separately from each other into the caches of the thread processors. A cache of the main processor 810.0 may store values of a first pointer 911 pointing to the first block 821.1, values of a second pointer 912 pointing to the second block 821.2, values of a third pointer 913 pointing to the third block 821.3 and values of a fourth pointer 914 pointing to the fourth block 821.4 for a separately loading of the first key-tensor part 1640.1, the second key-tensor part 1640.2, the first value-tensor part 1650.1 and the second value-tensor part 1650.2 into the cache of the main processor 810.0.

In one example, the main processor 810.0 may be configured to compute the first query-tensor part 2830.1 and the second query-tensor part 2830.2. FIG. 9 may depict one example of how the main processor 810.0 may distribute the chunks of the first tensors for computing the entries of the second input matrix 1860 in parallel.

The main processor 810.0 may send the first pointer 911 and the first query-tensor part 2830.1 to the first processor 810.1. The first processor 810.1 may load the first key-tensor part 1640.1 into the first cache 1821. In one example, the first processor 810.1 may compute an encrypted first set of polynomials which may represent a first entry 1860.1 of the second input matrix 1860 in the ciphertext domain.

The main processor 810.0 may send the first pointer 911 and the second query-tensor part 2830.2 to the second processor 810.2. The second processor 810.2 may load the first key-tensor part 1640.1 into the second cache 2821. In one example, the second processor 810.2 may compute an encrypted second set of polynomials which may represent a second entry 1860.2 of the second input matrix 1860 in the ciphertext domain.

Analogously, the main processor 810.0 may send the second pointer 912 and the first query-tensor part 2830.1 to the third processor 810.3. The third processor 810.3 may load the second key-tensor part 1640.2 into the third cache 3821. In one example, the third processor 810.3 may compute an encrypted third set of polynomials which may represent a third entry 1860.3 of the second input matrix 1860 in the ciphertext domain.

Analogously, the main processor 810.0 may send the second pointer 912 and the second query-tensor part 2830.2 to the fourth processor 810.4. The fourth processor 810.4 may load the second key-tensor part 1640.2 into the fourth cache 4821. In one example, the fourth processor 810.4 may compute an encrypted fourth set of polynomials which may represent a fourth entry 1860.4 of the second input matrix 1860 in the ciphertext domain.

The dividing the blocks of the cache 821 and making them accessible independently from each other may allow a fast access for the thread processors to the first tensors, for example the first key-tensor part 1640.1, the second key-tensor part 1640.2, the first value-tensor part 1650.1 and the second value-tensor part 1650.2. This may enable a faster computing of the second input matrix 1860 and by that a faster computation of the output of the AI-module 1.

The term "module" as used herein refers to any known or in the future developed hardware, software such as an executable program, artificial intelligence, fuzzy-logic or combination hereof for performing a function associated with the "module" or being a result of having performed the function associated with the "module". For example, the main processor 810.0 may comprise an AI-module program comprising instructions for the processor 810.0 or the thread processors. The main processor 810.0 or the thread processors may execute functions which are associated with the AI-module 1 when processing the instructions of the AI-module program. The respective function associated with the AI-module 1 may be described with the introductory phrase " . . . the AI-module 1 is configured to . . . ". Similarly, the main processor 810.0 may comprise a function module program comprising instructions for the processor 810.0 or the thread processors. The main processor 810.0 or the thread processors may execute functions which are associated with the function module 10 when processing the instructions of the function module program. The respective function associated with the function module 10 may be described with the introductory phrase " . . . the function module 10 is configured to . . . ". The AI-module program and the function module program may be part of the below described code 900.

Computing environment 800 contains an example of an environment for the execution of at least some of the computer code involved in performing the inventive methods, such as code 900 for calculating a fully homomorphically encrypted output value of a function of an artificial intelligence module according to one of the above described variants. The computer environment 800 may be one example of the above mentioned computer system. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 10. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"), for example a method for calculating a fully homomorphically encrypted output value of a function of an artificial intelligence module according to one of the variants mentioned above. These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

CLOUD COMPUTING SERVICES AND/OR MICRO-SERVICES (not separately shown in FIG. 10): private and public clouds are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim." A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A method for calculating a fully homomorphically encrypted output value of a function of a transformer-based AI-module, dependent on a fully homomorphically encrypted input value of the function, the function representing a non-linear function to be approximated by the function, the method comprising:

providing fully homomorphically encrypted precomputed terms which are independent from the input value; and calculating the output value of the function, using the transformer-based AI-Module, dependent on the precomputed terms and on polynomials, wherein a respective polynomial depends on a difference between the input value and a center value associated to the respective polynomial, wherein the associated center value indicates a center point at which the respective polynomial is centered and the associated center value differs from polynomial to polynomial.

2. The method of claim 1, wherein the respective polynomial depends on a set of powers for the respective polynomial, the powers of the respective set depending each on the difference between the input value and the center value associated to the respective polynomial as a basis of the respective power and on a natural number as an exponent of the respective power, the natural numbers increasing from power to power of the respective polynomial.

3. The method of claim 2, wherein the respective polynomial depends on a set of products for the respective polynomial, wherein the respective product of the respective set comprises one of the precomputed terms and one of the powers of the respective set of powers as factors.

4. The method of claim 2, wherein the calculating of the output value of the function dependent on the polynomials and the precomputed terms further comprises:

providing a combined polynomial resulting from combining terms having a same natural number as an exponent, wherein the terms result from expanding the respective set of powers of the respective polynomial and arranging the expanded sets of powers together in a form of a single mathematical expression, wherein the combined polynomial comprises the precomputed terms and further terms which depend on the input value and comprise the natural numbers as an exponent;

evaluating the further terms dependent on the input value; and calculating the output value as a result of evaluating the combined polynomial on the basis of the precomputed terms and the evaluated further terms.

5. The method of claim 4, wherein the providing of the combined polynomial further comprises providing fully homomorphically encrypted coefficients of the combined polynomial, wherein the encrypted coefficients of the combined polynomial represent the combined polynomial in a ciphertext domain.

6. The method of claim 5, wherein the encrypted coefficients of the combined polynomial are part of the precomputed terms.

7. The method of claim 1, wherein the precomputed terms depend on derivatives of the non-linear function evaluated at the center points.

8. The method of claim 1, wherein the respective polynomial represents a respective Taylor polynomial for the non-linear function, wherein the respective Taylor polynomial is centered at the respective center value which is associated to the respective polynomial.

9. The method of claim 1, wherein the calculating of the output value of the function comprises evaluating a linear combination of the polynomials.

10. The method of claim 1, wherein the non-linear function is a Gaussian Error Linear Unit function.

11. The method of claim 1, wherein the non-linear function is an exponential function of a softmax function.

12. The method of claim 1, wherein the transformer-based AI-Module is a transformer-based Large Language Model.

13. The method of claim 12, wherein the function is a function of an attention module of the transformer-based Large Language Model.

14. The method of claim 1, the method further comprising:

receiving a first encrypted input;

determining, using the transformer-based AI-Module, fully homomorphically encrypted entries of first key-vectors, first value-vectors, and first query-vectors of an attention module of the transformer-based AI-Module, in a form of fully homomorphically encrypted coefficients of first further polynomials dependent on the first input;

storing a part of the first key-vectors and the first value-vectors, in the form of first tensors, wherein entries of the first tensors comprise the coefficients of a part of the first further polynomials which is associated to the part of the first key-vectors, first value-vectors, and first query-vectors;

determining the input value of the function dependent on the entries of the first vectors;

determining a first output of the transformer-based AI-Module dependent on the output value of the function;

receiving a second encrypted input;

determining, using the transformer-based AI-Module, second key-vectors, second value-vectors, and second query-vectors of the attention module, dependent on the second input;

determining a second input value of the function dependent on the stored first tensors and the second key-vectors, second value-vectors, and second query-vectors;

determining a second output value of the function dependent on the second input value; and determining a second output of the transformer-based AI-Module dependent on the second output value of the function.

15. The method of claim 14, the method further comprising providing a caching device for storing the first tensors;

dividing the first tensors into chunks of the first tensors; and storing the chunks in memory blocks of the caching device, wherein the blocks are accessible independently from each other for reading out the chunks of the first tensors independently from each other.

16. The method of claim 15, the method further comprising:

allocating the memory blocks non-contiguously in the caching device.

17. A method for enhancing a transformer-based AI-module, the transformer-based AI-module comprising a non-linear function for calculating an output value of the non-linear function dependent on an input value, the method comprising:

substituting the non-linear function with a function, the function depending on precomputed terms that are independent from the input value and on polynomials, wherein a respective polynomial depends on a difference between the input value and a center value associated to the respective polynomial, wherein the associated center value indicates a center point at which the respective polynomial is centered and the associated center value differs from polynomial to polynomial, wherein the function is designed to prescribe an approximated output value of the non-linear function in response to presenting the input value as an argument of the non-linear function.

18. A computer system for calculating a fully homomorphically encrypted output value of a function of an artificial intelligence module, AI-module, in particular of a transformer-based AI-module, dependent on a fully homomorphically encrypted input value of the function, the function representing a non-linear function to be approximated by the function, wherein the computer system is configured to:

provide fully homomorphically encrypted precomputed terms which are independent from the input value, calculate the output value of the function, using the AI-Module, dependent on the precomputed terms and on polynomials, the respective polynomial depending on a difference between the input value and a center value associated to the respective polynomial, wherein the associated center value indicates a center point at which the respective polynomial is centered and the associated center value differs from polynomial to polynomial.

19. The computer system of claim 18, wherein the respective polynomial depending on a set of powers for the respective polynomial, the powers of the respective set depending each on the difference between the input value and the center value associated to the respective polynomial as a basis of the respective power and on a natural number as an exponent of the respective power, the natural numbers increasing from power to power of the respective polynomial.

20. The computer system of claim 19, wherein the respective polynomial depends on a set of products for the respective polynomial, wherein the respective product of the respective set comprises one of the precomputed terms and one of the powers of the respective set of powers as factors, wherein the precomputed terms depend on derivatives of the non-linear function evaluated at the center points;

wherein the respective polynomial represents a respective Taylor polynomial for the non-linear function, wherein the respective Taylor polynomial is centered at the respective center value which is associated to the respective polynomial; and wherein the computer system is configured to calculate the output value of the function through evaluating a linear combination of the polynomials.

* * * * *